(12) United States Patent
Laperle et al.

(10) Patent No.: US 12,291,292 B2
(45) Date of Patent: May 6, 2025

(54) WHEEL OF TRACK SYSTEM FOR TRACTION OF A VEHICLE

(71) Applicant: CAMSO INC., Magog (CA)

(72) Inventors: Ghislain Laperle, Sherbrooke (CA); Matthieu Bergeron, Sherbooke (CA); Brandon Thompson, Emporia, KS (US)

(73) Assignee: Camso Inc., Magog (CA)

( * ) Notice: Subject to any disclaimer, the term of this patent is extended or adjusted under 35 U.S.C. 154(b) by 466 days.

(21) Appl. No.: 17/601,166

(22) PCT Filed: Apr. 3, 2020

(86) PCT No.: PCT/CA2020/050451
§ 371 (c)(1),
(2) Date: Oct. 4, 2021

(87) PCT Pub. No.: WO2020/198882
PCT Pub. Date: Oct. 8, 2020

(65) Prior Publication Data
US 2022/0169325 A1 Jun. 2, 2022

Related U.S. Application Data

(60) Provisional application No. 62/828,660, filed on Apr. 3, 2019.

(51) Int. Cl.
*B62D 55/14* (2006.01)
*B60B 7/00* (2006.01)
(Continued)

(52) U.S. Cl.
CPC ............ *B62D 55/14* (2013.01); *B60B 7/0086* (2013.01); *B60B 7/066* (2013.01); *B60B 7/08* (2013.01);
(Continued)

(58) Field of Classification Search
CPC ...... B62D 55/14; B62D 55/145; B62D 55/15; B62D 55/088; B62D 55/32; B60B 7/0086; B60B 7/08; B60B 7/12; B60B 7/066
See application file for complete search history.

(56) References Cited

U.S. PATENT DOCUMENTS 2,113,541 A * 4/1938 Blank .................. B60B 7/105
152/427
2,689,770 A * 9/1954 Pipes ...................... B60B 7/12
301/37.32
(Continued)

FOREIGN PATENT DOCUMENTS

| CA | 2895432 | 12/2014 |
|---|---|---|
| FR | 2724902 | 9/1994 |

(Continued)

OTHER PUBLICATIONS

International Search Report and Written Opinion issued on Jun. 29, 2020, in connection with PCT/CA2020/050451, filed Apr. 3, 2020, 9 pages.
(Continued)

*Primary Examiner* — Kip T Kotter
(74) *Attorney, Agent, or Firm* — Hahn Loeser & Parks LLP

(57) ABSTRACT

A wheel of a track system for traction of a vehicle (e.g., an agricultural vehicle) may be configured to protect against (e.g., prevent) accumulation of unwanted ground matter, such as mud, debris, water, etc., within the wheel, while enhancing visual appearance of the wheel. This may help to avoid or minimize mud buildup that may otherwise need to be drilled out before removing the wheel (e.g., for replacement or maintenance) and/or rust that may otherwise arise.

23 Claims, 33 Drawing Sheets

(51) Int. Cl.
   *B60B 7/06*    (2006.01)
   *B60B 7/08*    (2006.01)
   *B60B 7/12*    (2006.01)
   *B62D 55/088*  (2006.01)
   *B62D 55/15*   (2006.01)
   *B62D 55/32*   (2006.01)

(52) U.S. Cl.
   CPC .............. *B60B 7/12* (2013.01); *B62D 55/088* (2013.01); *B62D 55/15* (2013.01); *B62D 55/32* (2013.01)

(56) References Cited

U.S. PATENT DOCUMENTS

| | | | | | |
|---|---|---|---|---|---|
| 2,799,539 | A | * | 7/1957 | Lyon | B60B 7/04 |
| | | | | | 301/37.38 |
| 2,857,022 | A | * | 10/1958 | Lyon | B60B 7/08 |
| | | | | | 301/6.3 |
| 3,059,730 | A | * | 10/1962 | Nickell | F16D 55/228 |
| | | | | | 188/71.6 |
| 3,217,775 | A | * | 11/1965 | Lawson | B60B 19/00 |
| | | | | | 152/9 |
| 4,219,241 | A | * | 8/1980 | Muller | B60B 7/00 |
| | | | | | 301/6.3 |
| 6,299,264 | B1 | | 10/2001 | Kautsch et al. | |
| 6,371,578 | B1 | | 4/2002 | Ferguson | |
| 9,656,705 | B2 | | 5/2017 | Kalmes et al. | |
| 2016/0121946 | A1 | * | 5/2016 | Piens | B62D 55/088 |
| | | | | | 305/132 |
| 2018/0072358 | A1 | * | 3/2018 | Vik | B62D 55/088 |
| 2018/0126776 | A1 | * | 5/2018 | Chinavare | B60B 3/087 |

FOREIGN PATENT DOCUMENTS

| | | | | | |
|---|---|---|---|---|---|
| FR | 2724902 | A1 | * | 3/1996 | ............ B62D 55/14 |
| FR | 2862907 | A1 | * | 6/2005 | ............ B60B 19/10 |
| JP | 08239066 | A | * | 9/1996 | |
| JP | 2002326587 | A | * | 11/2002 | |
| WO | WO8501480 | A1 | | 4/1985 | |
| WO | 2020198882 | | | 10/2020 | |

OTHER PUBLICATIONS

Communication pursuant to Article 94(3) EPC dated Feb. 7, 2025.

* cited by examiner

WHEEL OF TRACK SYSTEM FOR TRACTION OF A VEHICLE

CROSS-REFERENCE TO RELATED APPLICATIONS

This application is a National Stage of International PCT Patent Application PCT/CA2020/050451 filed on Apr. 3, 2020, which claims priority from U.S. Provisional Patent Application No. 62/828,660 filed on Apr. 3, 2019. The contents of the above-referenced documents are incorporated herein by reference in their entirety.

FIELD

This disclosure relates generally to off-road vehicles (e.g., agricultural vehicles or other industrial vehicles, etc.) and, more particularly, to track systems for traction of such vehicles.

BACKGROUND

Off-road vehicles, including industrial vehicles such as agricultural vehicles (e.g., tractors, harvesters, combines, etc.), construction vehicles (e.g., loaders, excavators, bulldozers, etc.), and forestry vehicles (e.g., feller-bunchers, tree chippers, knuckleboom loaders, etc.), military vehicles (e.g., combat engineering vehicles (CEVs), etc.), snowmobiles, and all-terrain vehicles (ATVs), may include track systems to enhance their traction and floatation on soft, slippery and/or irregular grounds (e.g., soil, mud, sand, ice, snow, etc.).

A vehicle's track system comprises a track movable around wheels that drive and guide the track and support loading. The wheels may sometimes present issues. For example, mud, debris, water, and/or other undesirable ground matter may accumulate within the wheels and cause problems, such as mud buildup that may make it difficult to remove, replace, or perform maintenance on the wheels, rusting due to trapped water, added weight, imbalances, etc.

For these and other reasons, there is a need to improve wheels of track systems for traction of vehicles.

SUMMARY

In accordance with various aspects of this disclosure, a wheel of a track system for traction of a vehicle may be configured to protect against (e.g., prevent) accumulation of unwanted ground matter, such as mud, debris, water, etc., within the wheel, while enhancing visual appearance of the wheel. This may help to avoid or minimize mud buildup that may otherwise need to be drilled out before removing the wheel (e.g., for replacement or maintenance) and/or rust that may otherwise arise.

For example, in accordance with an aspect, this disclosure relates to a wheel for a track system of a vehicle, the track system comprising a track-engaging assembly that includes the wheel and a track movable around the track-engaging assembly, the track being elastomeric to flex around the track-engaging assembly. The wheel comprises: a body comprising a rim portion, a hub portion, and a radially-extending portion between the rim portion and the hub portion, the body of the wheel defining an internal void; and a shield removably attached to the body of the wheel and configured to protect against mud buildup in the internal void of the body of the wheel.

In accordance with another aspect, this disclosure relates to a wheel for a track system of a vehicle, the track system comprising a track-engaging assembly that includes the wheel and a track movable around the track-engaging assembly, the track being elastomeric to flex around the track-engaging assembly. The wheel comprises: a body comprising a rim portion, a hub portion, and a radially-extending portion between the rim portion and the hub portion, the hub portion of the body of the wheel comprising openings to receive fasteners for fastening the hub portion of the body of the wheel to a hub; and a shield removably attached to the body of the wheel and configured to protect against mud buildup over the fasteners.

In accordance with another aspect, this disclosure relates to a method of protecting a wheel of a track system of a vehicle against mud buildup, the track system comprising a track-engaging assembly that includes the wheel and a track movable around the track-engaging assembly, the track being elastomeric to flex around the track-engaging assembly, the wheel comprising a body comprising a rim portion, a hub portion, and a radially-extending portion between the rim portion and the hub portion, the body of the wheel defining an internal void. The method comprises: providing a shield; and removably attaching the shield to the body of the wheel to protect against mud buildup in the internal void of the body of the wheel.

In accordance with another aspect, this disclosure relates to a method of protecting a wheel of a track system of a vehicle against mud buildup, the track system comprising a track-engaging assembly that includes the wheel and a track movable around the track-engaging assembly, the track being elastomeric to flex around the track-engaging assembly, the wheel comprising a body comprising a rim portion, a hub portion, and a radially-extending portion between the rim portion and the hub portion, the hub portion of the body of the wheel comprising openings to receive fasteners for fastening the hub portion of the body of the wheel to a hub. The method comprises: providing a shield; and removably attaching the shield to the body of the wheel to protect against mud buildup over the fasteners.

In accordance with another aspect, this disclosure relates to a method of servicing a wheel for a track system of a vehicle, the track system comprising a track-engaging assembly that includes the wheel and a track movable around the track-engaging assembly, the track being elastomeric to flex around the track-engaging assembly, the wheel comprising a body comprising a rim portion, a hub portion, and a radially-extending portion between the rim portion and the hub portion, the body of the wheel defining an internal void, the wheel comprising a shield removably attached to the body of the wheel and configured to protect against mud buildup in the internal void of the body of the wheel. The method comprises: removing the shield; and accessing the internal void of the body of the wheel.

In accordance with another aspect, this disclosure relates to a method of servicing a wheel for a track system of a vehicle, the track system comprising a track-engaging assembly that includes the wheel and a track movable around the track-engaging assembly, the track being elastomeric to flex around the track-engaging assembly, the wheel comprising a body comprising a rim portion, a hub portion, and a radially-extending portion between the rim portion and the hub portion, the hub portion of the body of the wheel comprising openings to receive fasteners for fastening the hub portion of the body of the wheel to a hub, the wheel comprising a shield removably attached to the body of the wheel and configured to protect against mud buildup over the fasteners. The method comprises: removing the shield; and unfastening the fasteners from the hub portion of the body of the wheel.

These and other aspects of this disclosure will now become apparent to those of ordinary skill in the art upon review of a description of embodiments in conjunction with accompanying drawings.

BRIEF DESCRIPTION OF THE DRAWINGS

A detailed description of embodiments is provided below, by way of example only, with reference to accompanying drawings, in which.

It is to be expressly understood that the description and drawings are only for purposes of illustrating certain embodiments and are an aid for understanding. They are not intended to and should not be limiting.

DETAILED DESCRIPTION OF EMBODIMENTS

Figure 1:
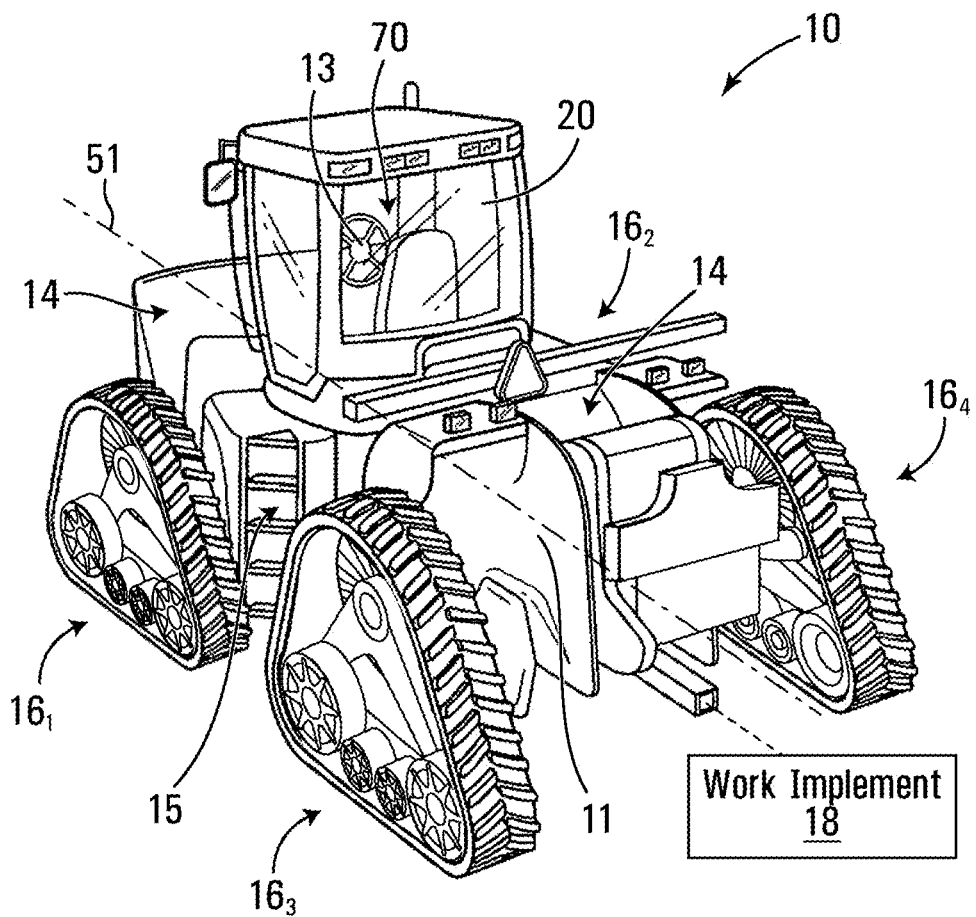
FIG. 1 shows an example of an agricultural vehicle comprising a track system in accordance with an embodiment of the disclosure.

FIG. 1 shows an example of an embodiment of a vehicle 10 comprising track systems $16_1$-$16_4$. In this embodiment, the vehicle 10 is a heavy-duty work vehicle for performing agricultural, construction or other industrial work, or military work. More particularly, in this embodiment, the vehicle 10 is an agricultural vehicle for performing agricultural work. Specifically, in this example, the agricultural vehicle 10 is a tractor. In other examples, the agricultural vehicle 10 may be a harvester, a planter, or any other type of agricultural vehicle.

In this embodiment, the vehicle 10 comprises a frame 11, a powertrain 15, a steering mechanism 13, the track systems $16_1$-$16_4$ and an operator cabin 20 that enable a user to move the vehicle 10 on the ground, including on an agricultural field and possibly on a paved road (e.g., between agricultural fields), and perform work using a work implement 18.

As further discussed later, in this embodiment, wheels of the track systems $16_1$-$16_4$ may be designed to protect against (e.g., prevent) accumulation of unwanted ground matter, such as mud, debris, water, etc., within them, while enhancing their visual appearance. This may help to avoid or minimize mud buildup that may otherwise need to be drilled out before removing them (e.g., for replacement or maintenance) and/or rust that may otherwise arise.

The powertrain 15 is configured to generate power for the agricultural vehicle 10, including motive power for the track systems $16_1$-$16_4$ to propel the vehicle 10 on the ground. To that end, the powertrain 15 comprises a power source 14 (e.g., a primer mover) that includes one or more motors. For example, in this embodiment, the power source 14 comprises an internal combustion engine. In other embodiments, the power source 14 may comprise another type of motor (e.g., an electric motor) or a combination of different types of motor (e.g., an internal combustion engine and an electric motor). The powertrain 15 can transmit power from the power source 14 to one or more of the track systems $16_1$-$16_4$ in any suitable way (e.g., via a transmission, a differential, a direct connection, and/or any other suitable mechanism). In some embodiments, at least part of the powertrain 15 (e.g., a motor and/or a transmission) may be part of one or more of the track systems $16_1$-$16_4$.

The operator cabin 20 is where the user sits and controls the vehicle 10. More particularly, the operator cabin 20 comprises a user interface 70 allowing the user to steer the vehicle 10 on the ground, operate the work implement 18, and control other aspects of the vehicle 10. In this embodiment, the user interface 70 comprises input devices, such as an accelerator, a brake control, and a steering device (e.g., a steering wheel, a stick, etc.) that are operated by the user to control motion of the vehicle 10 on the ground. The user interface 70 also comprises output devices such as an instrument panel (e.g., a dashboard) which provides indicators (e.g., a speedometer indicator, a tachometer indicator, etc.) to convey information to the user.

The work implement 18 is used to perform agricultural work. For example, in some embodiments, the work implement 18 may include a combine head, a cutter, a scraper pan, a tool bar, a planter, or any other type of agricultural work implement.

The track systems $16_1$-$16_4$ engage the ground to provide traction to the vehicle 10. More particularly, in this embodiment, front ones of the track systems $16_1$-$16_4$ provide front traction to the vehicle 10, while rear ones of the track systems $16_1$-$16_4$ provide rear traction to the vehicle 10.

In this embodiment, each of the front ones of the track systems $16_1$-$16_4$ is pivotable relative to the frame 11 of the vehicle 10 about a steering axis 19 by the steering mechanism 13 (e.g., in response to input of the user at the steering device of the user interface 70) to change the orientation of that track system relative to the frame 11 in order to steer the vehicle 10 on the ground. The orientation of each of the front ones of the track systems $16_1$-$16_4$ relative to a longitudinal axis 51 of the vehicle 10, which defines a steering angle of that track system, is thus changeable. In this example, the steering mechanism 13 includes a steering unit (e.g., comprising a steering knuckle) on each side of the vehicle 10 dedicated to each of the front ones of the track systems $16_1$-$16_4$ and defining the steering axis 19 for that track system. Each of the front ones of the track systems $16_1$-$16_4$ is therefore steerable.

Figure 2:
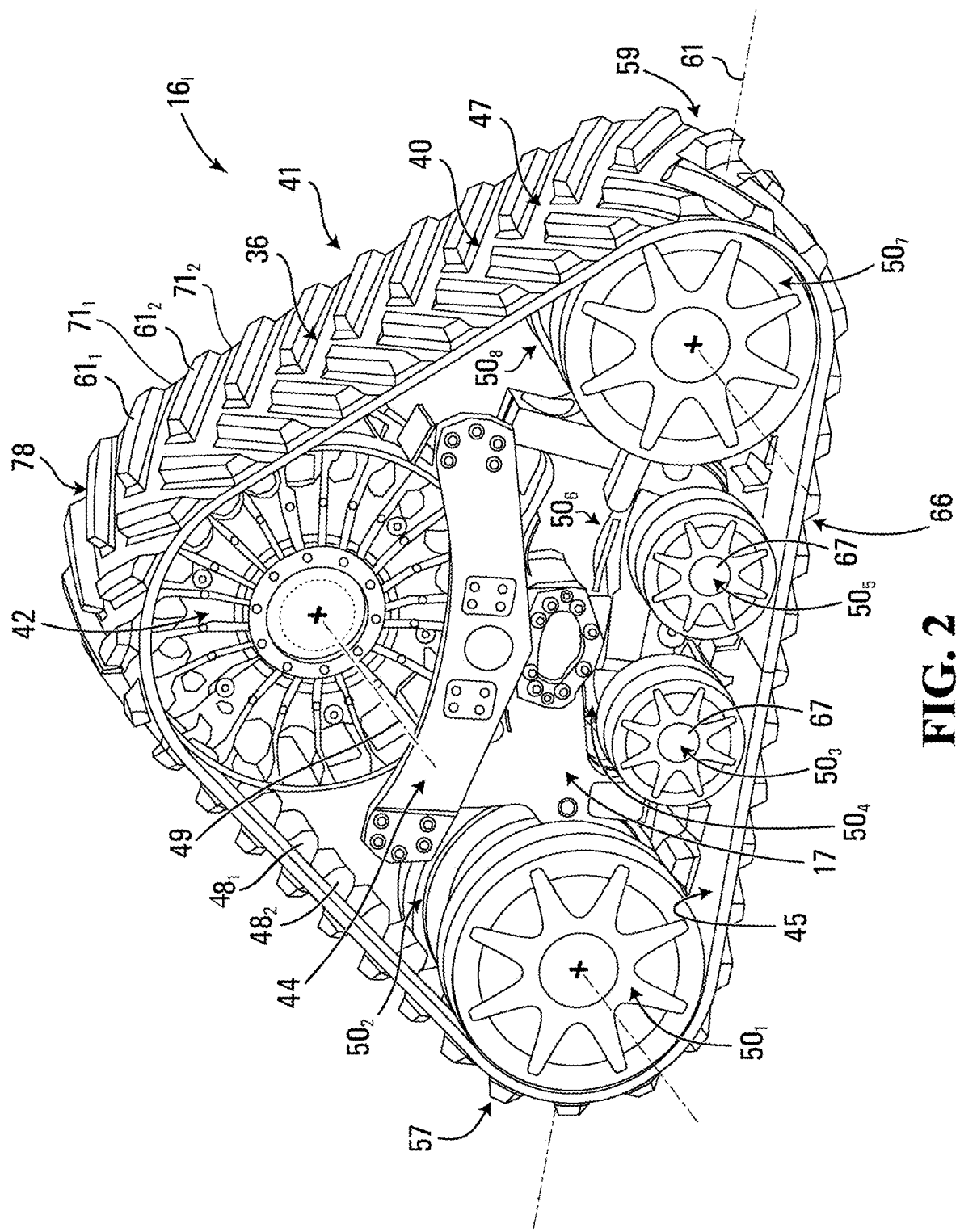
FIG. 2 shows a side view of the track system.
Figure 4:
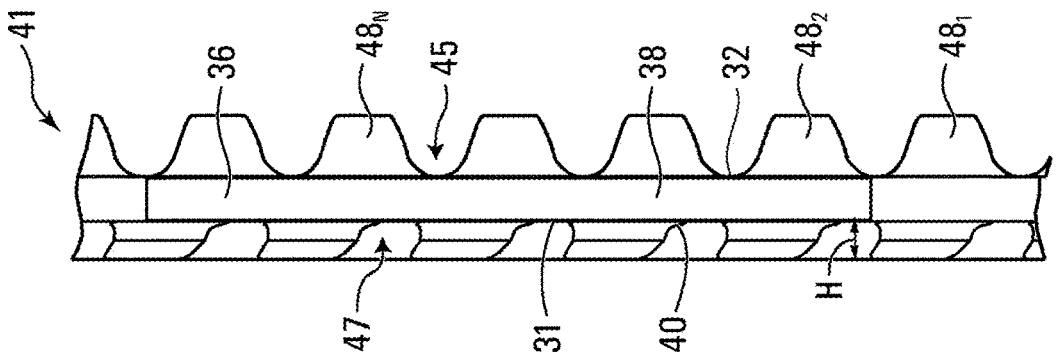
FIGS. 3 and 4 show a plan view and a side view of a track of the track system.
Figure 3:
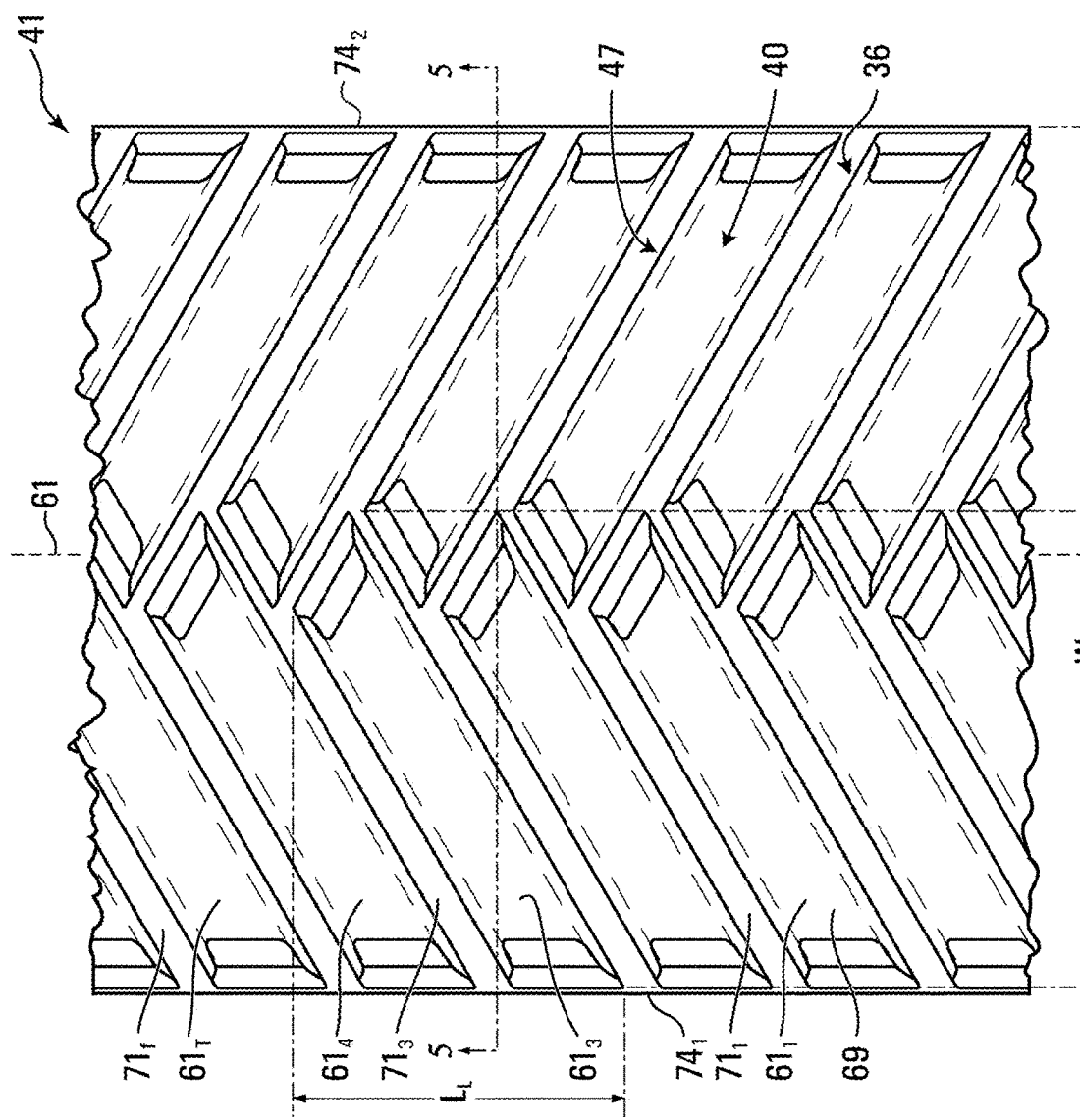
Figure 5:
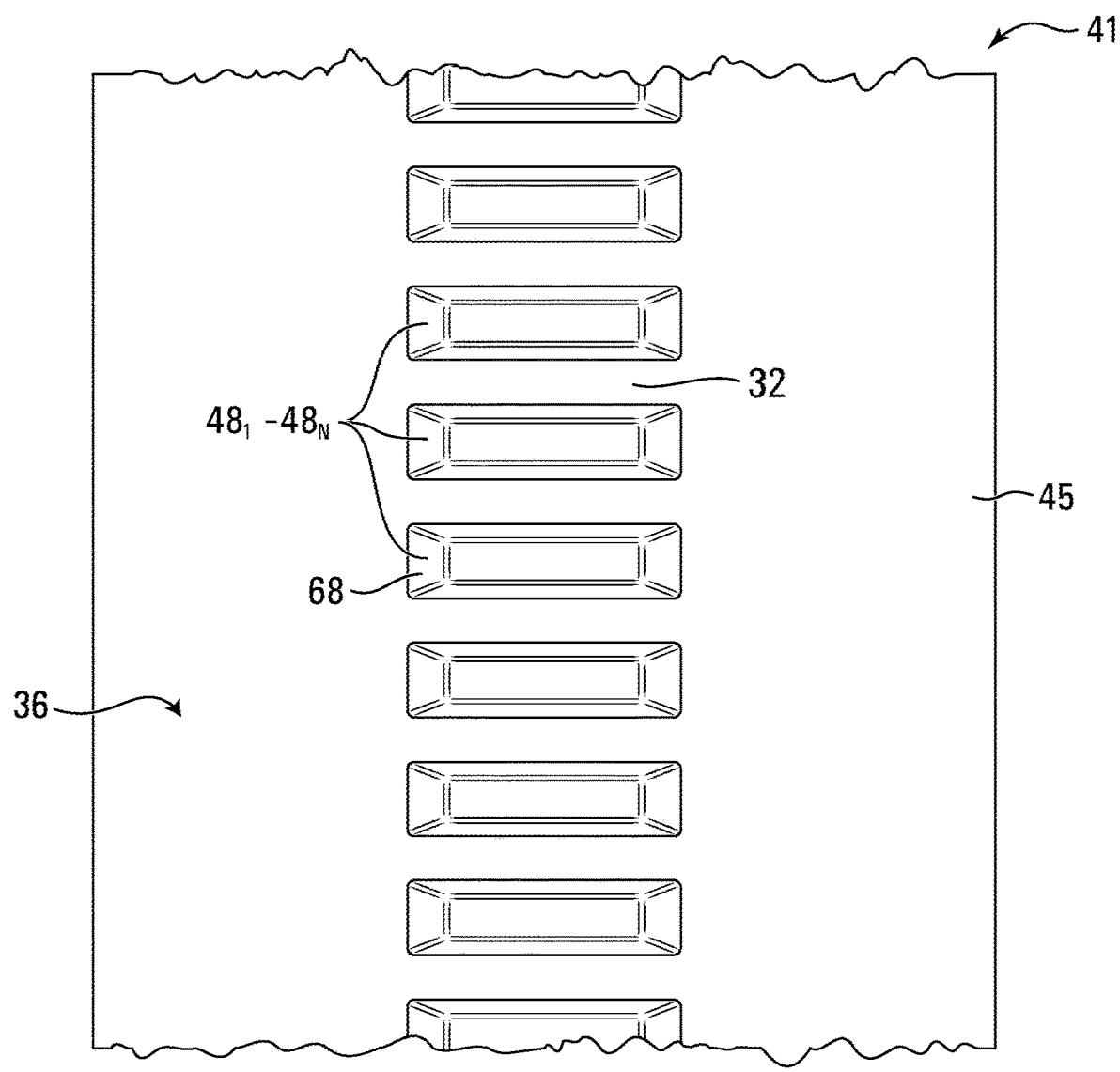
FIG. 5 shows an inside view of the track.
Figure 6:
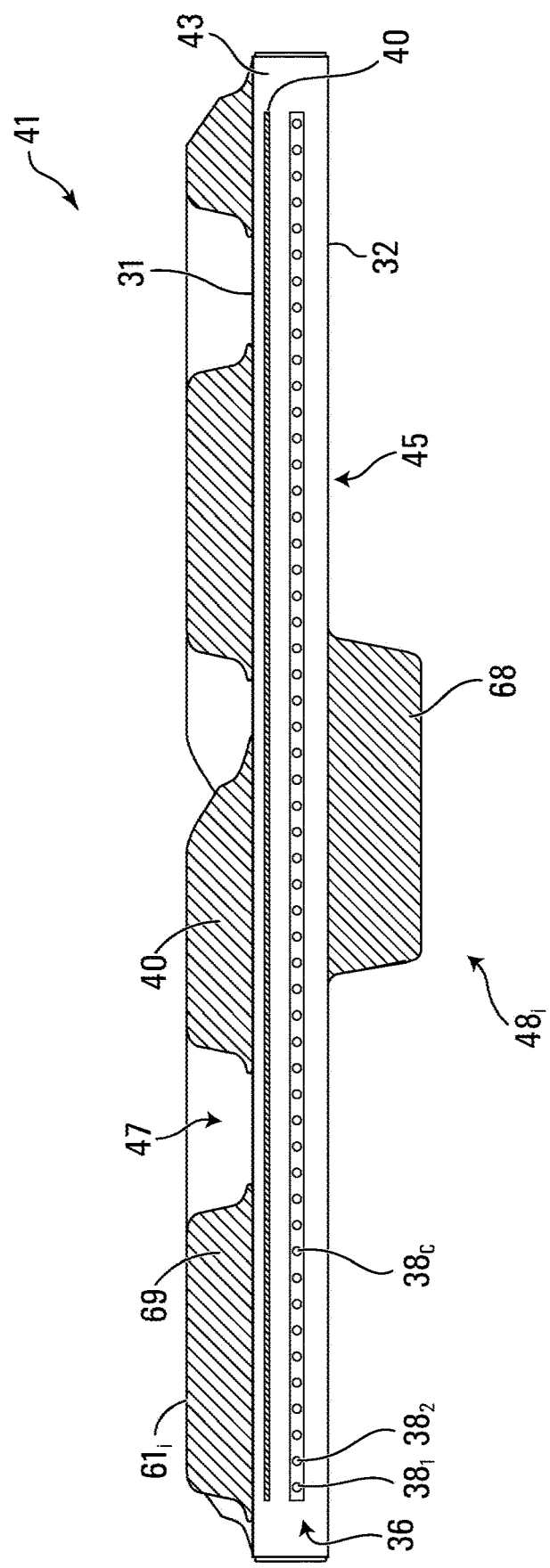
FIG. 6 shows a cross-sectional view of the track.

With additional reference to FIG. 2, in this embodiment, each track system $16_i$ comprises a track 41 and a track-engaging assembly 17 that is configured to drive and guide the track 41 around the track-engaging assembly 17. In this example, the track-engaging assembly 17 comprises a frame 44 and a plurality of track-engaging wheels which includes a drive wheel 42 and a plurality of track-contacting wheels $50_1$-$50_8$, which includes leading idler wheels $50_1$, $50_2$, trailing idler wheels $50_7$, $50_8$, and roller wheels $50_3$-$50_6$ between the leading idler wheels $50_1$, $50_2$ and the trailing idler wheels $50_7$, $50_8$. The wheels $50_1$-$50_8$ are rotatable about axis of rotations $53_1$-$53_8$. The track system $16_i$ has a front longitudinal end 57 and a rear longitudinal end 59 that define a length of the track system $16_i$. A width of the track system $16_i$ is defined by a width $W_T$ of the track 41. The track system $16_i$ has a longitudinal direction, a widthwise direction, and a heightwise direction.

The track 41 engages the ground to provide traction to the vehicle 10. A length of the track 41 allows the track 41 to be mounted around the track-engaging assembly 17. In view of its closed configuration without ends that allows it to be disposed and moved around the track-engaging assembly 17, the track 41 can be referred to as an "endless" track. Referring additionally to FIGS. 3 to 6, the track 41 comprises an inner side 45 facing the wheels 42, $50_1$-$50_8$ and defining an inner area of the track 41 in which these wheels are located. The track 41 also comprises a ground-engaging outer side 47 opposite the inner side 45 for engaging the ground on which the vehicle 10 travels. Lateral edges $74_1$, $74_2$ of the track 41 define its width $W_T$. The track 41 has a top run 78 which extends between the longitudinal ends 57, 59 of the track system 16; and over the track-engaging assembly 17, and a bottom run 66 which extends between the longitudinal ends 57, 59 of the track system $16_i$ and under the track-engaging assembly 17. The track 41 has a longitudinal direction, a widthwise direction, and a thicknesswise direction.

The track 41 is elastomeric, i.e., comprises elastomeric material, allowing it to flex around the wheels 42, $50_1$-$50_8$. The elastomeric material of the track 41 can include any polymeric material with suitable elasticity. In this embodiment, the elastomeric material includes rubber. Various rubber compounds may be used and, in some cases, different rubber compounds may be present in different areas of the track 41. In other embodiments, the elastomeric material of the track 41 may include another elastomer in addition to or instead of rubber (e.g., polyurethane elastomer). The track 41 can be molded into shape in a mold by a molding process during which its elastomeric material is cured.

More particularly, the track 41 comprises an elastomeric belt-shaped body 36 underlying its inner side 45 and its ground-engaging outer side 47. In view of its underlying nature, the body 36 can be referred to as a "carcass". The carcass 36 comprises elastomeric material 43 which allows the track 41 to flex around the wheels 42, $50_1$-$50_8$.

In this embodiment, the carcass 36 comprises a plurality of reinforcements embedded in its elastomeric material 43. One example of a reinforcement is a layer of reinforcing cables $38_1$-$38_c$ that are adjacent to one another and that extend in the longitudinal direction of the track 41 to enhance strength in tension of the track 41 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). Another example of a reinforcement is a layer of reinforcing fabric 40. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

The carcass 36 may be molded into shape in the track's molding process during which its elastomeric material 43 is cured. For example, in this embodiment, layers of elastomeric material providing the elastomeric material 43 of the carcass 36, the reinforcing cables $38_1$-$38_c$ and the layer of reinforcing fabric 40 may be placed into the mold and consolidated during molding.

In this embodiment, the inner side 45 of the track 41 comprises an inner surface 32 of the carcass 36 and a plurality of wheel-contacting projections $48_1$-$48_N$ that project from the inner surface 32 to contact at least some of the wheels 42, $50_1$-$50_8$ and that are used to do at least one of driving (i.e., imparting motion to) the track 41 and guiding the track 41. In that sense, the wheel-contacting projections $48_1$-$48_N$ can be referred to as "drive/guide projections", meaning that each drive/guide projection is used to do at least one of driving the track 41 and guiding the track 41. Also, such drive/guide projections are sometimes referred to as "drive/guide lugs" and will thus be referred to as such herein. More particularly, in this embodiment, the drive/guide lugs $48_1$-$48_N$ interact with the drive wheel 42 in order to cause the track 41 to be driven, and also interact with the idler wheels $50_1$-$50_8$ in order to guide the track 41 as it is driven by the drive wheel 42. The drive/guide lugs $48_1$-$48_N$ are thus used to both drive the track 41 and guide the track 41 in this embodiment.

The drive/guide lugs $48_1$-$48_N$ are spaced apart along the longitudinal direction of the track 41. In this case, the drive/guide lugs $48_1$-$48_N$ are arranged in a plurality of rows that are spaced apart along the widthwise direction of the track 41. The drive/guide lugs $48_1$-$48_N$ may be arranged in other manners in other embodiments (e.g., a single row or more than two rows). Each of the drive/guide lugs $48_1$-$48_N$ is an elastomeric drive/guide lug in that it comprises elastomeric material 68. The drive/guide lugs $48_1$-$48_N$ can be provided and connected to the carcass 36 in the mold during the track's molding process.

The ground-engaging outer side 47 of the track 41 comprises a ground-engaging outer surface 31 of the carcass 36 and a plurality of traction projections $61_1$-$61_M$ that project from the outer surface 31 and engage and may penetrate into the ground to enhance traction. The traction projections $61_1$-$61_M$, which can sometimes be referred to as "traction lugs", are spaced apart in the longitudinal direction of the track system $16_i$. The ground-engaging outer side 47 comprises a plurality of traction-projection-free areas $71_1$-$71_F$ (i.e., areas free of traction projections) between successive ones of the traction projections $61_1$-$61_M$. In this example, each of the traction projections $61_1$-$61_M$ is an elastomeric traction projection in that it comprises elastomeric material 69. The traction projections $61_1$-$61_M$ can be provided and connected to the carcass 36 in the mold during the track's molding process.

The track 41 may be constructed in various other ways in other embodiments. For example, in some embodiments, the track 41 may comprise a plurality of parts (e.g., rubber sections) interconnected to one another in a closed configuration, the track 41 may have recesses or holes that interact with the drive wheel 42 in order to cause the track 41 to be driven (e.g., in which case the drive/guide lugs $48_1$-$48_N$ may be used only to guide the track 41 without being used to drive the track 41), and/or the ground-engaging outer side 47 of the track 41 may comprise various patterns of traction projections.

The drive wheel 42 is rotatable about an axis of rotation 49 for driving the track 41 in response to rotation of an axle of the vehicle 10. In this example, the axis of rotation 49 corresponds to the axle of the vehicle 10. More particularly, in this example, the drive wheel 42 has a hub which is mounted to the axle of the vehicle 10 such that power generated by the power source 14 and delivered over the powertrain 15 of the vehicle 10 rotates the axle, which rotates the drive wheel 42, which imparts motion of the track 41.

Figure 7:
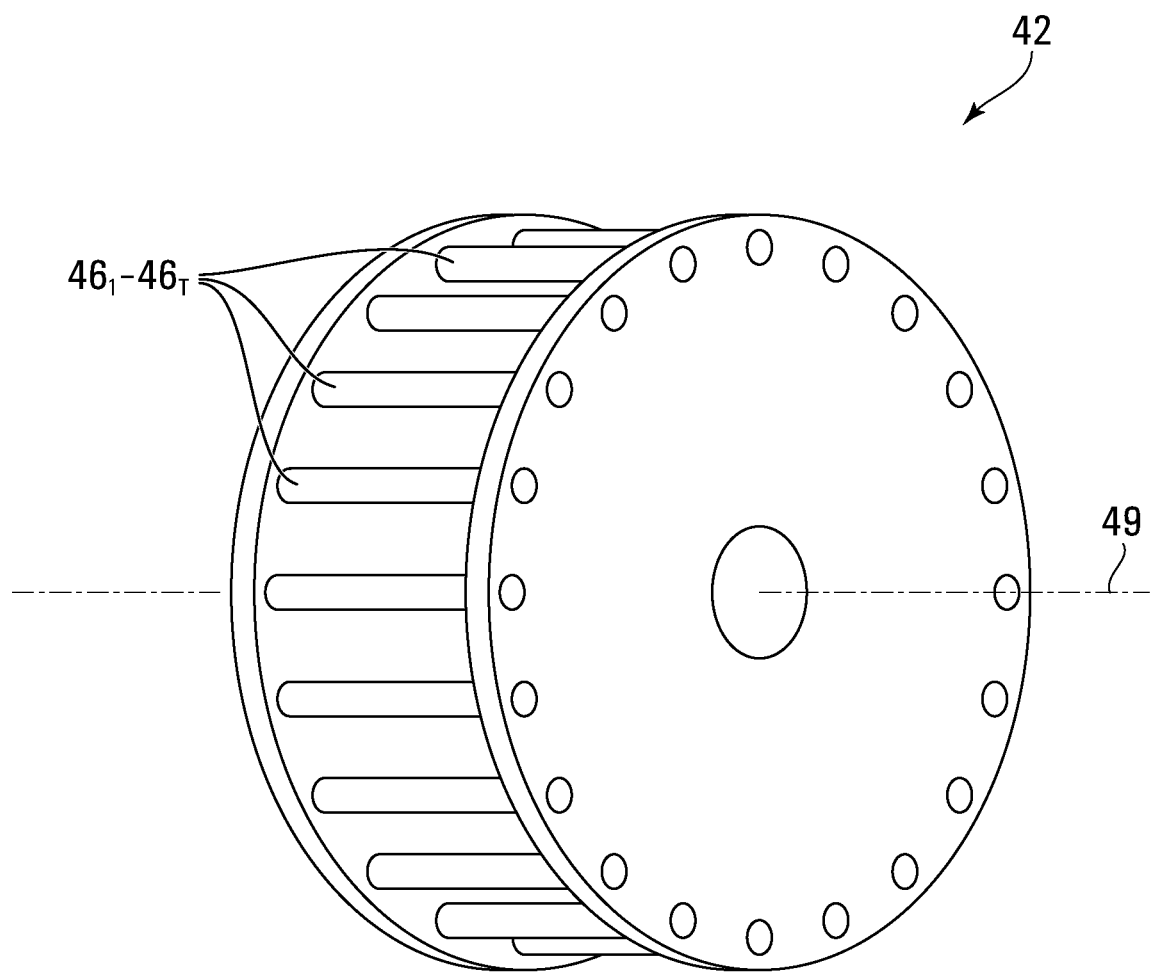
FIG. 7 shows a drive wheel of a track-engaging assembly of the track system.
Figure 8:
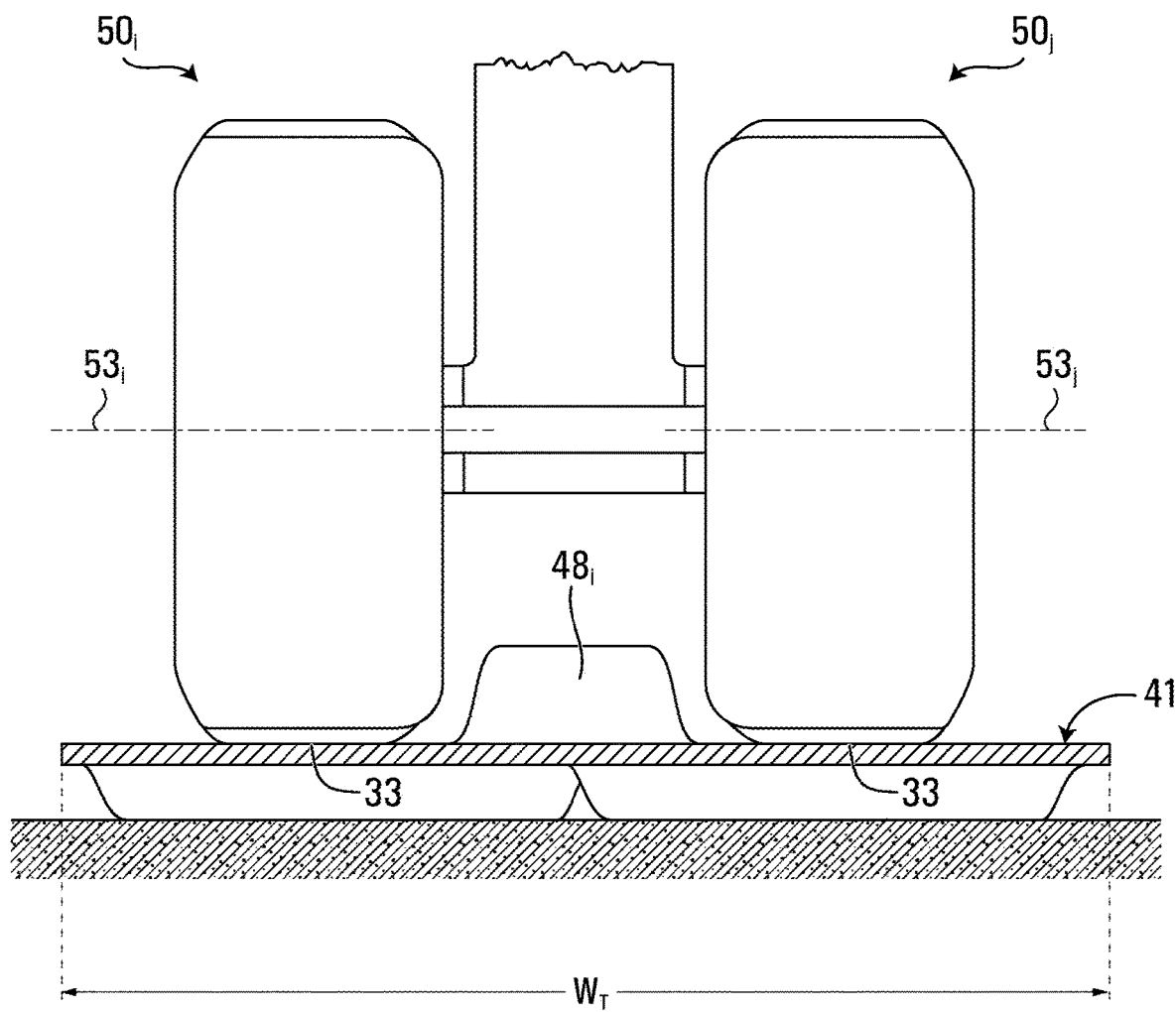
FIG. 8 shows mid-rollers of the track-engaging assembly engaging an inner side the track.
Figure 9:
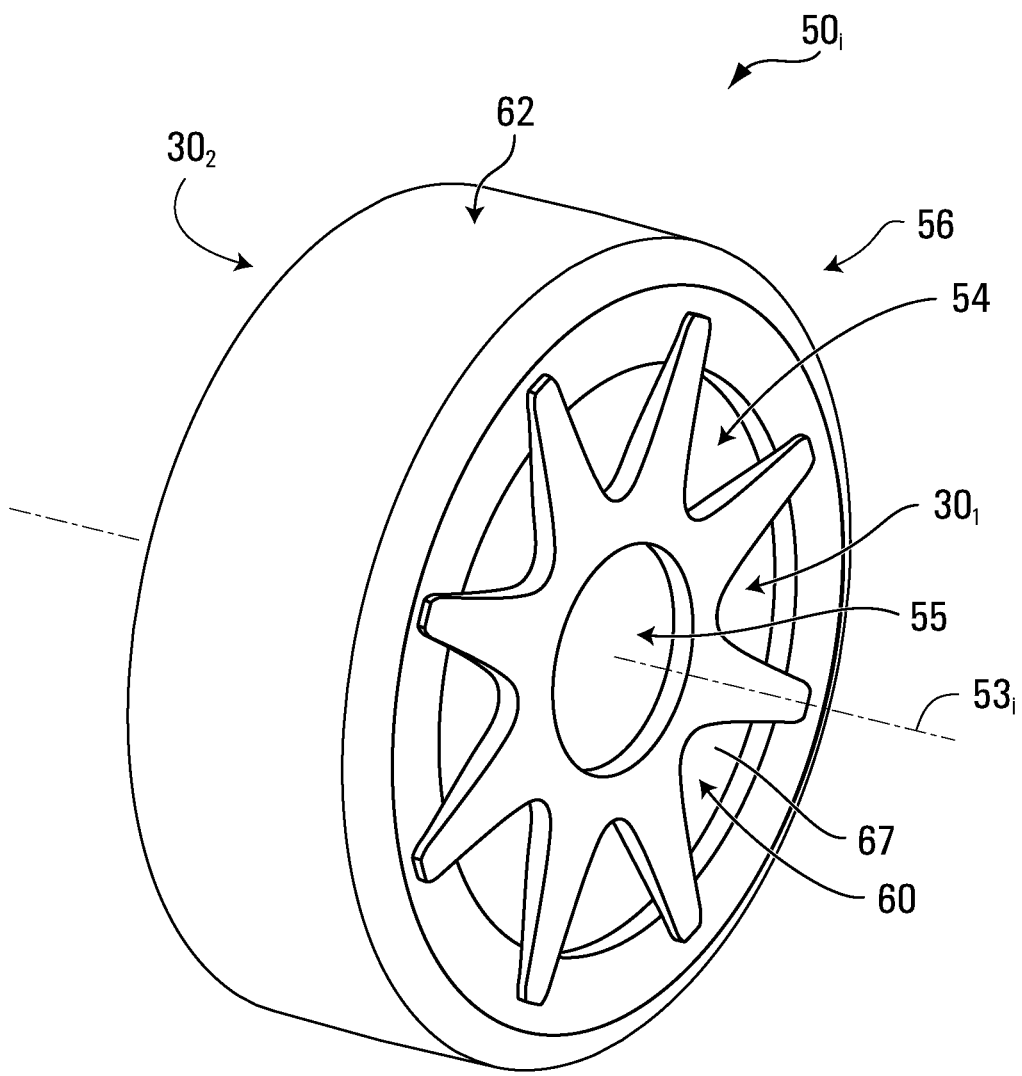
FIGS. 9 and 10 show perspective views of an idler wheel, and more particularly of a mid-roller, of the track-engaging assembly.
Figure 10:
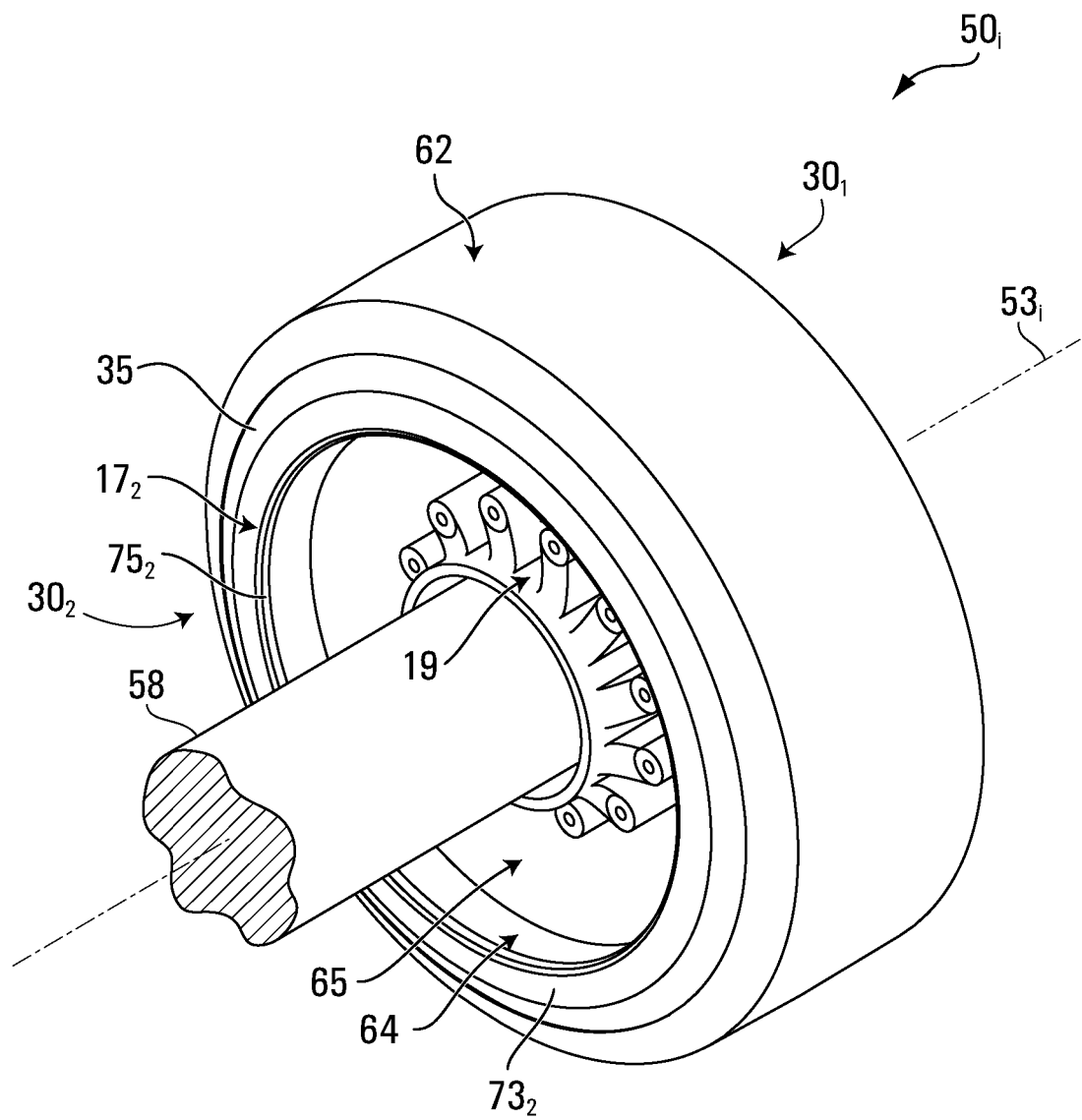
Figure 11:
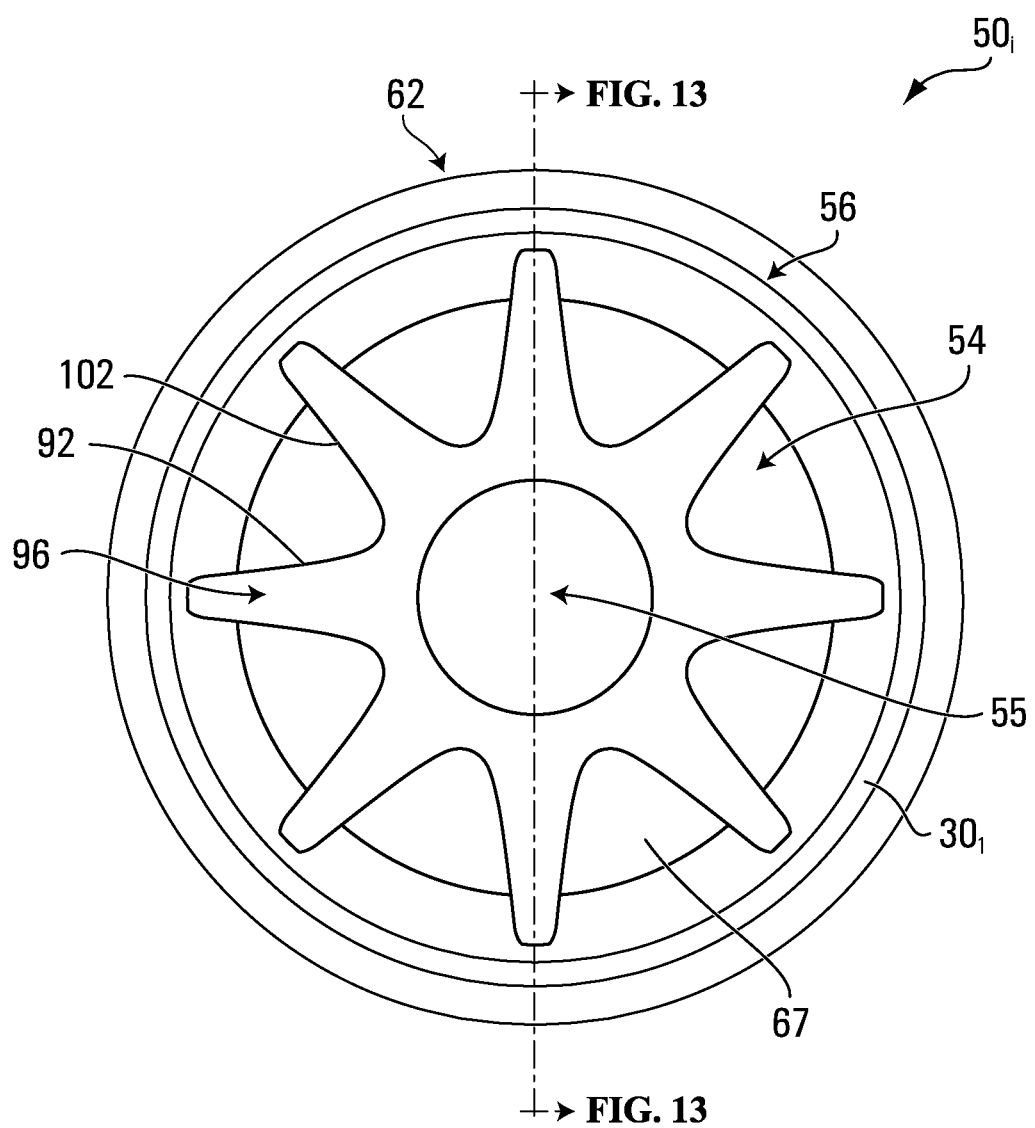
FIGS. 11 to 13 show a front view, a side view and a cross-sectional view of the mid-roller.
Figure 12:
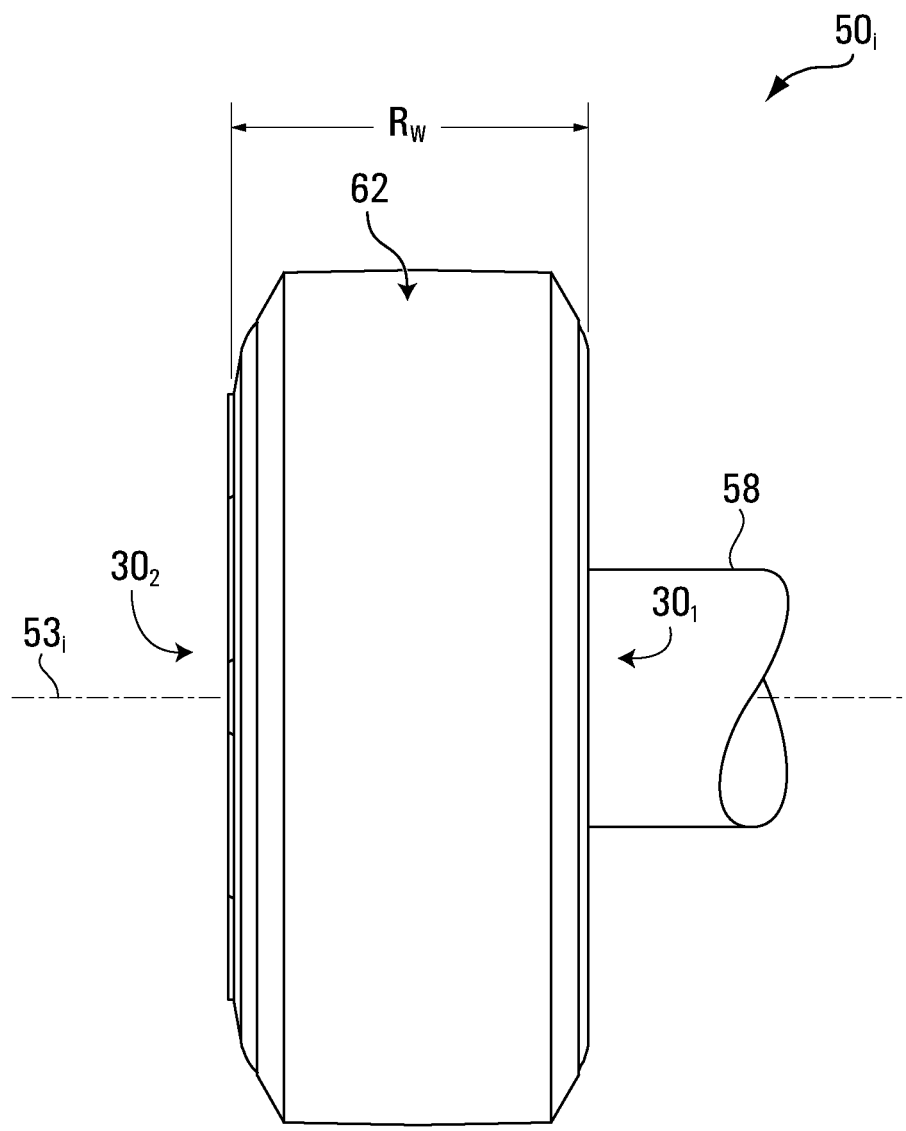
Figure 13:
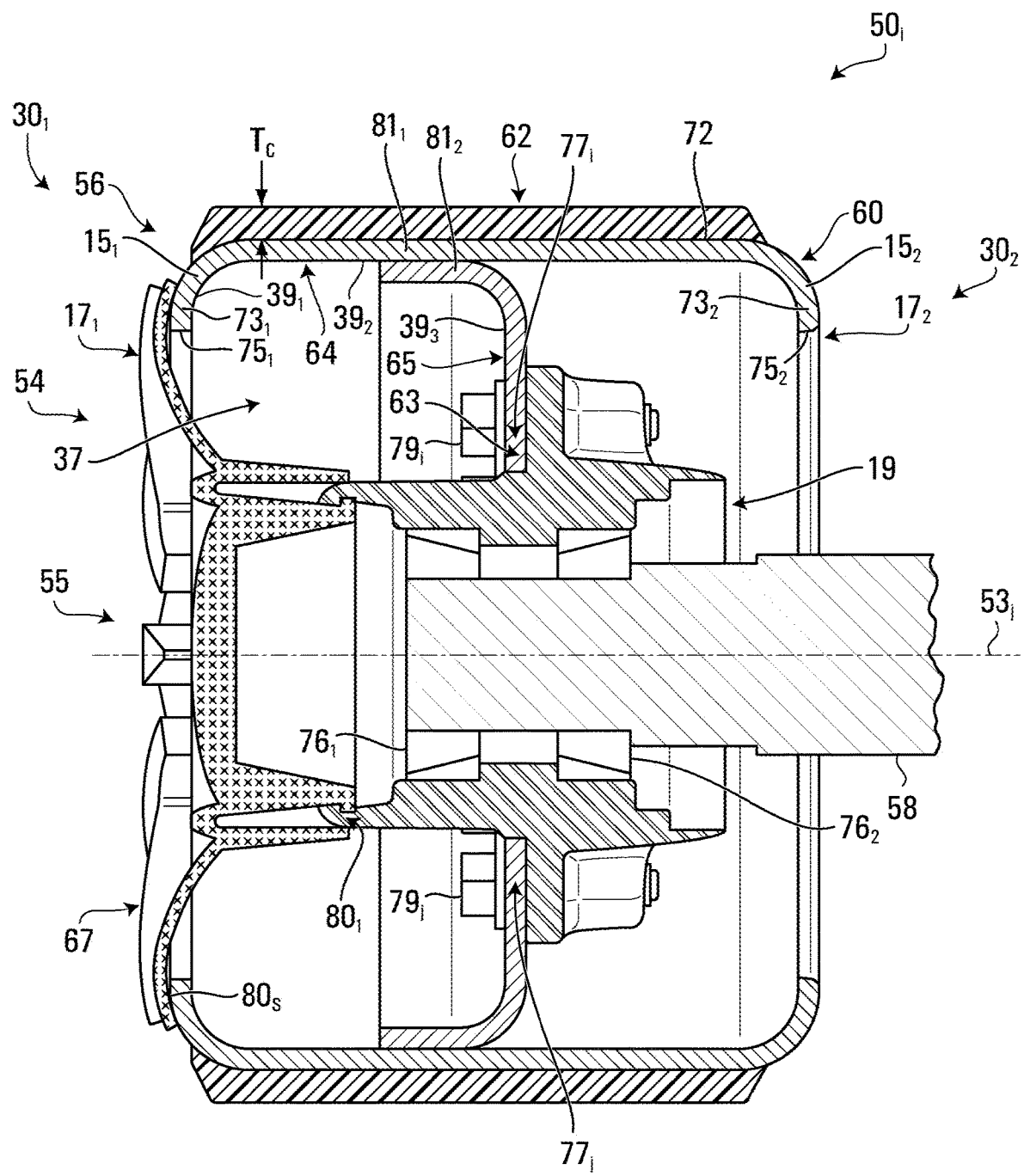

In this embodiment, as shown in FIG. 7, the drive wheel 42 comprises a drive sprocket engaging the drive/guide lugs $48_1$-$48_N$ of the inner side 45 of the track 41 in order to drive the track 41. In this case, the drive sprocket 42 comprises a plurality of drive members $46_1$-$46_T$ (e.g., bars, teeth, etc.) distributed circumferentially of the drive sprocket 42 to define a plurality of lug-receiving spaces therebetween that receive the drive/guide lugs $48_1$-$48_N$ of the track 41. The drive wheel 42 may be configured in various other ways in other embodiments. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The track-contacting wheels $50_1$-$50_8$ are not driven by power supplied by the powertrain 15, but are rather used to contact the bottom run of the track 66 of the track 41 and do at least one of supporting part of a weight of the vehicle 10 on the ground via the track 41, guiding the track 41 as it is driven by the drive wheel 42, and tensioning the track 41. More particularly, in this embodiment, the leading and trailing idler wheels $50_1$, $50_2$, $50_7$, $50_8$ maintain the track 41 in tension, and can help to support part of the weight of the vehicle 10 on the ground via the track 41. The roller wheels $50_3$-$50_6$ roll on the inner side 45 of the track 41 along the bottom run 66 of the track 41 to apply the bottom run 66 on the ground. As they are located between the leading and trailing idler wheels $50_1$, $50_2$, $50_7$, $50_8$, the roller wheels $50_3$-$50_6$ may be referred to as "mid-rollers". The track-contacting wheels $50_1$-$50_8$ may be arranged in other configurations and/or the track system $16_i$ may comprise more or less of them in other embodiments.

The frame 44 of the track system $16_i$ supports components of the track system $16_i$, including the track-contacting wheels $50_1$-$50_8$. More particularly, in this embodiment, the front idler wheels $50_1$, $50_2$ are mounted to the frame 44 in a front longitudinal end region of the frame 44 proximate the front longitudinal end 57 of the track system $16_i$, while the rear idler wheels $50_7$, $50_8$ are mounted to the frame 44 in a rear longitudinal end region of the frame 44 proximate the rear longitudinal end 59 of the track system $16_i$. The mid-rollers $50_3$-$50_6$ are mounted to the frame 44 in a central region of the frame 44 between the front idler wheels $50_1$, $50_2$ and the rear idler wheels $50_7$, $50_8$. Each of the mid-rollers $50_3$-$50_6$ may be rotatably mounted directly to the frame 44 or may be rotatably mounted to a link which is pivotally mounted to the frame 44 to which is rotatably mounted an adjacent one of the mid-rollers $50_3$-$50_6$ (e.g., forming a "tandem").

The frame 44 of the track system 16; is supported at a support area. More specifically, in this embodiment, the frame 44 is supported by the axle of the vehicle 10 to which is coupled the drive wheel 42, such that the support area is intersected by the axis of rotation 49 of the drive wheel 42.

Figure 26:
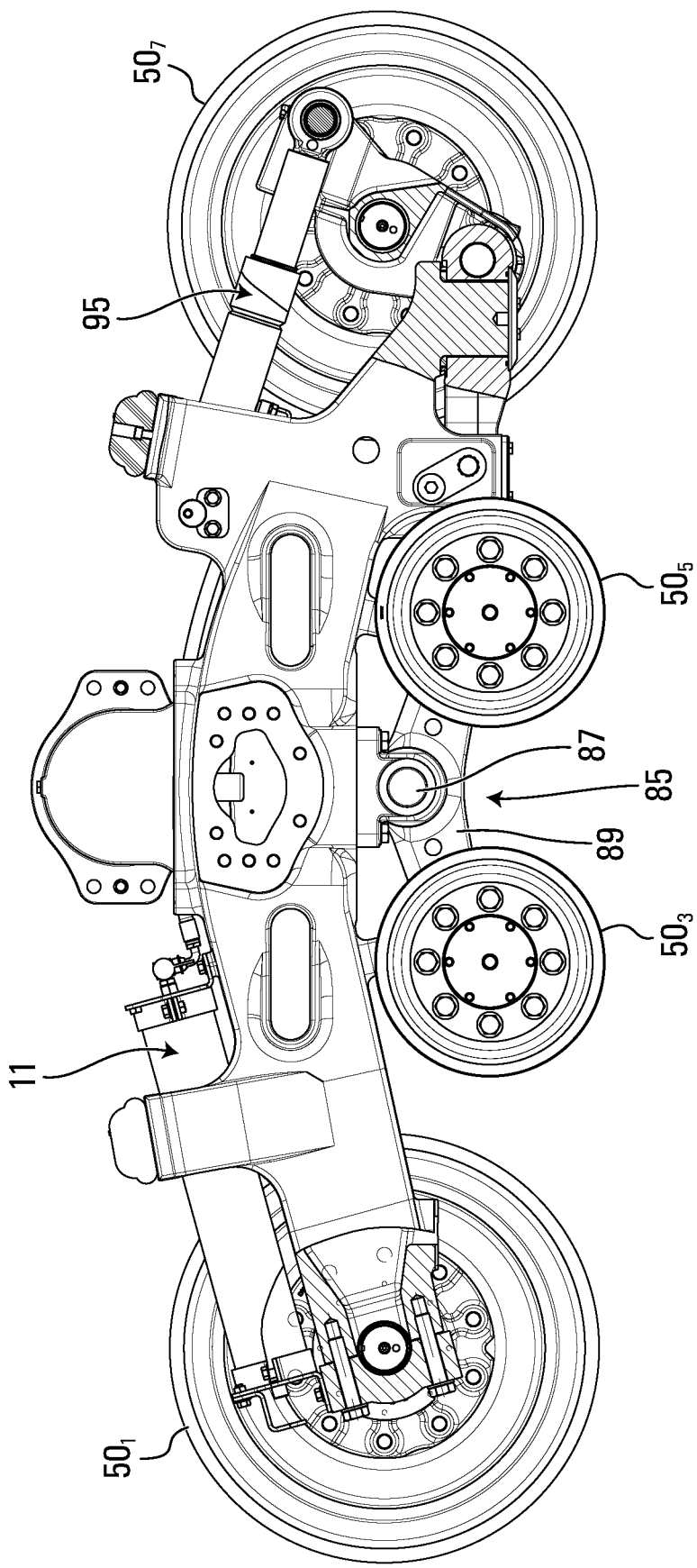
FIG. 26 shows a partial cross-sectional side view of a lower portion of the track system, including a bogie for mounting the mid-rollers.
Figure 27:
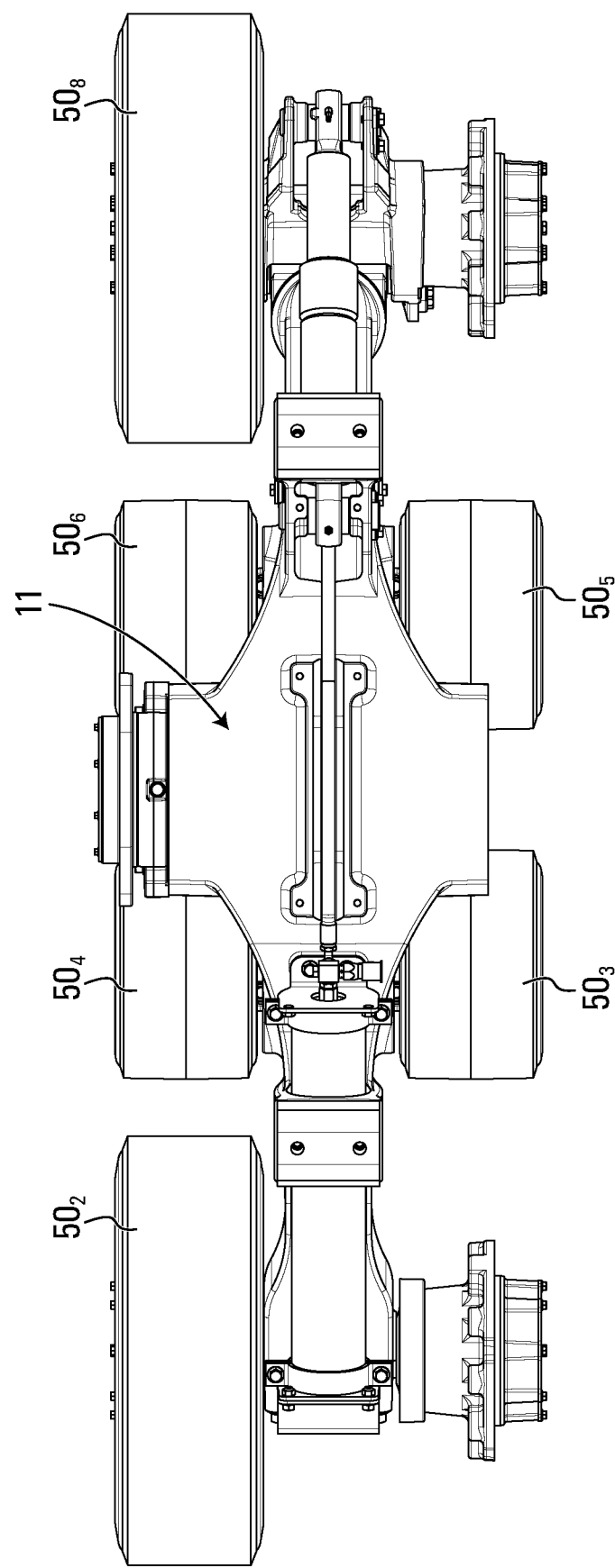
FIG. 27 shows a top view of the lower portion of the track system with two idler wheels being omitted to show a hub of the idler wheels.

In addition, in this embodiment, as shown in FIGS. 26 and 27, the track system $16_i$ comprises a wheel-mounting subassembly 85 which may be referred to as a "bogie". The bogie 85 is configured to carry the mid-rollers $50_3$-$50_6$ and is mounted to the frame 11 of the track system $16_i$. More specifically, the bogie 85 comprises a link 89 to which are mounted the mid-rollers $50_3$-$50_6$. The bogie 85 is pivotable relative to the frame 11 of the track system $16_i$ about a pivot 87 defining an axis of rotation 88 that is perpendicular to the longitudinal axis 61 of the track system $16_i$. The bogie 85 thus imparts the mid-rollers $50_3$-$50_6$ with a pivoting motion capability which may be referred to as a "pitch" motion. The mid-rollers $50_3$-$50_6$ may not be mounted to a bogie in other embodiments. For example, the mid-rollers $50_3$-$50_6$ may be mounted directly to the frame 11 of the track system $16_i$ in other embodiments.

Moreover, as shown in FIG. 26, the track system $16_i$ may comprise a tensioning mechanism 95 for tensioning the track 41. For instance, in this embodiment, the tensioning mechanism 95 comprises an actuator mounted at one end to the frame 11 of the track system $16_i$ and at another end to a hub of the front idler wheels $50_1$, $50_2$. This allows the tensioning mechanism 95 to modify a distance between the front idler wheels $50_1$, $50_2$ and the rear idler wheels $50_7$, $50_8$ in the longitudinal direction of the track system $16_i$.

In this embodiment, respective ones of the track-contacting wheels $50_1$-$50_8$, notably the mid-rollers $50_3$-$50_6$, are configured to protect against (e.g., prevent) accumulation of unwanted ground matter, such as mud, debris, water, etc., within them, while enhancing their visual appearance. This may help to avoid or minimize mud buildup that may otherwise need to be drilled out before removing them (e.g., for replacement or maintenance) and/or rust that may otherwise arise.

With additional reference to FIGS. 8 to 20, each mid-roller $50_i$ comprises a circumferential portion 56, a hub portion 55, and a radially-extending portion 54 between the circumferential portion 56 and the hub portion 55. The hub portion 55 is an inner portion of the mid-roller $50_i$ which is associated with a hub 19 receiving an axle 58 for the mid-roller $50_i$ by fitting or press-fitting the axle 58 into bearings $76_1$, $76_2$, the bearings $76_1$, $76_2$ being fit or press-fit into an internal cavity of the hub 19, or by any suitable means. The circumferential portion 56 is an outer portion of the mid-roller $50_i$ which rolls on the inner side 45 of the track 41. The radially-extending portion 34 is an intermediate portion of the mid-roller $50_i$ which extends radially between the hub portion 55 and the circumferential portion 56.

The mid-roller $50_i$ comprises lateral sides $30_1$, $30_2$ opposite one another and a circumferential surface 32 between the lateral sides $30_1$, $30_2$ that rolls on the inner side 45 of the track 41. More particularly, in this embodiment, the inner side 45 of the track 41 comprises a rolling path 33 on which the mid-roller $50_i$ rolls. The rolling path 33 is delimited by some of the drive/guide lugs $48_1$-$48_N$ such that, as the mid-roller $50_i$ rolls, these drive/guide lugs pass next to the mid-roller $50_i$.

The mid-roller $50_i$ may contact a drive/guide lug $48i$ of the track 41 adjacent to it during motion of the track 41. More particularly, in this embodiment, the lateral side $30_2$ of the mid-roller $50_i$, which faces the drive/guide lug $48i$, comprises a projection-contacting part 35 that can contact the drive/guide lug $48i$ when the mid-roller $50i$ contacts the drive/guide lug $48i$ as the drive/guide lug $48i$ passes next to the mid-roller $50i$. The projection-contacting part 35, which will be referred to as a "lug-contacting part", has a shape that depends on respective shapes of the mid-roller $50i$ and the drive/guide lug $48i$, but generally has a radial dimension in a direction parallel to a radius R of the mid-roller $50i$ no greater than a height of the drive/guide lug $48i$.

More particularly, in this embodiment, the mid-roller $50_i$ comprises: a body 60; a covering 62 on the body 60 to improve performance of the mid-roller $50_i$, such as by improving contact between the mid-roller $50_i$ and the inner side 45 of the track 41, enhancing an abrasion resistance of the mid-roller $50_i$, and/or by absorbing vibrations; and a shield 67 attached to the body 60 and configured to protect against (e.g., prevent) accumulation of unwanted ground matter, such as mud, debris, water, etc., within the mid-roller $50_i$, while enhancing its visual appearance.

The body 60 of the mid-roller $50_i$ is a core of the mid-roller $50_i$ that imparts structural integrity to the mid-roller $50_i$. The body 60 of the mid-roller $50_i$ has lateral sides $17_1$, $17_2$ opposite one another and a circumferential surface 72 between the lateral sides $17_1$, $17_2$. In this case, the lateral sides $17_1$, $17_2$ of the body 60 of the mid-roller $50_i$ constitute parts of the lateral sides $30_1$, $30_2$ of the mid-roller $50_i$, while the circumferential surface 72 of the body 60 of the mid-roller $50_i$ is covered by the covering 62. The body 60 of the mid-roller $50_i$ comprises a rim portion 64, a hub portion 63, and a radially-extending portion 65 between the rim portion 64 and the hub portion 63.

The hub portion 63 of the body 60 of the mid-roller $50_i$ constitutes the hub portion 55 of the mid-roller $50_i$. The hub portion 63 of the body 60 of the mid-roller $50_i$ is thus associated with the hub 19. In this case, the hub 19 is removably mounted to the body 60 of the mid-roller $50_i$. More particularly, in this case, the hub portion 63 of the body 60 of the mid-roller $50_i$ comprises a plurality of openings $77_1$-$77_O$ to receive a plurality of fasteners $79_1$-$79_O$ that interconnect the body 60 of the mid-roller $50_i$ to the hub 19. The hub portion 63 may be configured in various other ways in other embodiments (e.g., the hub 19 may be integrally formed (e.g., cast) with or permanently affixed (e.g., welded) to the hub portion 63 of the body 60 of the mid-roller $50_i$).

The rim portion 64 of the body 60 of the mid-roller $50_i$ is part of the rim portion 56 of the mid-roller $50_i$. The rim portion 64 comprises the circumferential surface 72 and outer parts of the lateral sides $17_1$, $17_2$ of the body 60 of the mid-roller $50_i$. In this embodiment, the rim portion 64 comprises shoulders $15_1$, $15_2$ turning radially inwardly to form flanges $73_1$, $73_2$ such that edges $75_1$, $75_2$ of the rim portion 64 are located radially inward of the circumferential surface 72 of the body 60 of the mid-roller $50_i$. More particularly, in this example, the shoulders $15_1$, $15_2$ turn radially inwardly by curving radially inwardly (e.g., such that the flanges $73_1$, $73_2$ are "curls"). In other examples, the shoulders $15_1$, $15_2$ may turn radially inwardly by being slanted or otherwise angled radially inwardly and/or may be partially curved radially inwardly and partially slanted or otherwise angled radially inwardly (i.e., may comprise one or more curved segments and one or more angled segments). The rim portion 64 may be configured in various other ways in other embodiments (e.g., the rim portion 64 may not comprise any shoulder such as the shoulders $15_1$, $15_2$).

The radially-extending portion 65 of the body 60 of the mid-roller $50_i$ constitutes the radially-extending portion 34 of the mid-roller $50_i$. The radially-extending portion 65 interconnects the hub portion 63 and the rim portion 64. In this embodiment, the radially-extending portion 65 and the hub portion 63 of the body 60 of the mid-roller $50_i$ constitute a one-piece component that is secured (e.g., welded) to the rim portion 64 of the body 60 of the mid-roller $50_i$, which is another one-piece component. The one-piece component constituted by the radially-extending portion 65 and the hub portion 63 of the body 60 of the mid-roller $50_i$ may sometimes be referred to as a "disk". The radially-extending portion 65 may be configured in various other ways in other embodiments.

In this embodiment, the hub portion 63, the rim portion 64, and the radially-extending portion 65 of the body 60 of the mid-roller $50_i$ define an internal void 37 of the mid-roller $50_i$ delimited by internal surfaces $39_1$-$39_3$ of the body 60 of the mid-roller $50_i$. The internal void 37 could cause unwanted ground matter, such as mud, debris, water, etc., to accumulate within the mid-roller $50_i$, particularly as the shoulders $15_1$, $15_2$ could cause a tendency for such unwanted ground matter to be retained within the mid-roller $50_i$, but this is prevented or minimized by the shield 67 in this embodiment, as discussed later.

The body 60 of the mid-roller $50_i$ is made of one or more materials. In some cases, the body 60 of the mid-roller $50_i$ may comprise a single material making up an entirety of the body 60. In other cases, the body 60 of the mid-roller $50_i$ may comprise two or more different materials that make up different parts of the body 60.

In this embodiment, the body 60 of the mid-roller $50_i$ is metallic, i.e., is at least mainly (i.e., mainly or entirely) made of a metallic material. The metallic material is selected to provide strength and rigidity to the mid-roller $50_i$. For example, in this case, the metallic material comprises steel. In other cases, the metallic material may comprise another metal instead of steel. In other embodiments, the body 60 of the mid-roller $50_i$ may be at least mainly made of another type of material (e.g., composite material, polymeric material, or ceramic material). Also, in other embodiments, different parts of the body 60 may be made of two or more materials (e.g., two types of steel).

Also, in this embodiment, at least part of the body 60 of the mid-roller $50_i$ is stamped into shape. That is, at least part of the body 60 of the mid-roller $50_i$ is formed by a stamping process. Notably, the rim portion 64, the hub portion 63 and the radially-extending portion 65 of the body 60 of the wheel $50_i$ may be stamped.

In this embodiment, the rim portion 64 of the body 60 of the mid-roller $50_i$ constitutes a first stamped component $81_1$, while the hub portion 63 and the radially-extending portion 65 of the body 60 of the wheel constitute a second one-piece component $81_2$ secured to the first one-piece component $81_1$ by any suitable means. For instance, the first stamped component $81_1$ and the second stamped component $81_2$ may be welded to one another (e.g., the second stamped component $81_2$ may be welded to the first stamped component $81_1$ or vice-versa).

The first stamped component $81_1$ may be manufactured by tube cutting and by then blasting the cut portion constituting the first stamped component $81_1$. That is, a portion of a tube is cut and then blasted, for instance by sand or by any other suitable material, in order to have a surface finish that will increase durability of the component.

The second stamped component $81_2$ may be punched, stamped, machined and blasted for finish. That is, a sheet of material may be punched to create a hole corresponding to the dimensions of the hub portion 63. The sheet of material may then be stamped to impart a shape to the sheet of material, the shape corresponding to the shape of the second stamped component $81_2$. The edges of the stamped sheet of material may be machined to provide more precise dimensions to the second stamped component $81_2$ and the stamped, machined sheet may be blasted, for instance by sand or by any other suitable material, in order to have a surface finish that will increase durability of the component.

The stamped components $81_1$, $81_2$ may be assembled by press fitting the second stamped component $81_2$ into the first stamped component $81_1$; by welding the stamped components $81_1$, $81_2$ to one another; by punching the openings $77_1$-$77_O$ of the hub portion 63; by curling the flanges $73_1$, $73_2$; by marking the assembly; and by blasting the assembly, for instance by sand or by any other suitable material, in order to have a surface finish that will increase durability of the component. Although in this embodiment the above-described steps are performed in the recited order to manufacture the body 60 of the mid-roller $50_i$, in other embodiments, the above-described steps may be performed in a different order and additional steps may also be performed to manufacture the body 60 of the mid-roller $50_i$.

The body 60 of the mid-roller $50_i$ may be manufactured in any other suitable way in other embodiments.

The covering 62 contacts the inner side 45 of the track 41 as the mid-roller 50i rolls on the inner side 45 of the track 22. In this embodiment, the covering 62 forms at least part of the circumferential surface 72 of the mid-roller 50i. The covering 62 may also form at least part of one of the lateral sides 301, 302 of the mid-roller 50i which faces a drive/guide lug 48i in other embodiments.

The covering 62 covers at least part of the body 60 of the mid-roller $50_i$. In this embodiment, the covering 62 covers part of the rim portion 64 of the body 60 of the mid-roller $50_i$. More particularly, in this embodiment, the covering 62 covers the circumferential surface 72 of the body 60 of the mid-roller $50_i$.

The covering 62 is made of one or more materials. In some cases, the covering 62 may comprise a single material making up an entirety of the covering 62. In other cases, the covering 62 may comprise two or more different covering materials that make up different parts of the covering 62.

A material of the covering 62 is different from a material of the body 60 of the mid-roller $50_i$. That is, the material of the covering 62 and the material of the body 60 of the mid-roller $50_i$ may belong to different classes of materials (i.e., metals, polymers, ceramics and composites) and/or may substantially differ in terms of one or more properties, such as strength, elasticity, hardness, friction coefficient, etc. For instance, in some cases: a strength (e.g., yield strength) of the wheel body material may be different from (e.g., greater than) a strength of the covering material; a modulus of elasticity of the covering material may be different from (e.g., less than) a modulus of elasticity of the wheel body material; an abrasion resistance of the covering material may be different from (e.g., greater than) an abrasion resistance of the wheel body material; a coefficient of friction of the covering material with the track 22 may be different from (e.g., less than) a coefficient of friction of the wheel body material with the track 22; etc.

A material of the covering 62 can be selected to provide desired properties to the covering 62. For example, the covering 62 may be less hard (i.e., have a lower hardness) and/or be more elastic (i.e., have a lower modulus of elasticity) than the body 60 of the mid-roller $50_i$. As another example, in order to reduce friction and heat generation, the covering 62 may have a low coefficient of friction with the track 41 and a high thermal conductivity. The coefficient of friction of the covering 62 with the track 41 may thus be lower than the coefficient of friction of the body 60 of the mid-roller $50_i$ with the track 41. Taking into account convective heat transfer associated with the shape of the covering 62, the thermal conductivity of the covering material may provide the covering 62 with a high thermal transmittance.

In this embodiment, the covering 62 is polymeric, i.e., at least mainly (i.e., mainly or entirely) made of a polymeric material. The polymeric material may be selected, for instance, to create a low-friction interface between the mid-roller $50_i$ and the inner side 45 of the track 41, to enhance an abrasion resistance of the mid-roller $50_i$, and/or to enhance a vibration absorption capacity of the mid-roller $50_i$. In some examples of implementation, the polymeric material may be elastomeric material such that the covering 62 is an elastomeric covering. In other examples of implementation, the polymeric material may be nonelastomeric material such that the covering 62 is a nonelastomeric covering. For example, in this case, the polymeric material comprises polyurethane (e.g., polyurethane elastomer). In other cases, the polymeric material may comprise another polymer instead of polyurethane (e.g., polytetrafluoroethylene (PTFE) (Teflon™), ultra-high-molecular-weight polyethylene (UHMW), thermoplastic polyolefin (TPO), etc.). In other embodiments, the covering 62 may be at least mainly made of another type of material (e.g., metallic material, ceramic material or composite material). Also, in other embodiments, different parts of the covering 62 may be made of two or more covering materials (e.g., two types of polymers).

A thickness $T_C$ of the covering 62 can have any desired value. For example, in some embodiments, a ratio of the thickness $T_C$ of the covering 62 to the radius R of the mid-roller $50_i$ may be no more than 0.12, in some cases no more than 0.10, in some cases no more than 0.08, in some cases no more than 0.06, in some cases no more than 0.04, in some cases no more than 0.02, and in some cases even less (e.g., 0.006). For instance, in some embodiments, the thickness $T_C$ of the covering 62 may be less than 12 mm, in some cases no more than 10 mm, in some cases no more than 8 mm, in some cases no more than 6 mm, and in some cases no more than 4 mm (e.g., 3 mm or less in some cases). Larger thickness values may not improve performance and may thus unnecessarily add material cost to the mid-roller $50_i$. This may apply to embodiments in which the covering 62 is a polyurethane covering. This may also apply in embodiments in which the covering 62 is made of another material. The thickness $T_C$ of the covering 62 may take on various other values in other embodiments.

The covering 62 may be provided on the body 60 of the mid-roller $50_i$ in various ways. For example, in some embodiments, the covering 62 may be a molded covering that is molded onto the body 60 of the mid-roller $50_i$ during manufacturing of the mid-roller $50_i$. The covering 62 may be provided on the body 60 of the mid-roller $50_i$ in other manners in other embodiments (e.g., adhesively bonded to the body 60, coated on the body 60, mechanically fastened to the body 60 with bolts or other fasteners, etc.).

Although it is configured in a certain way in this embodiment, the covering 62 may be configured in various other ways in other embodiments.

The shield 67 is attached to the body 60 of the mid-roller $50_i$ and configured to prevent unwanted ground matter, such as mud, debris, water, etc., from entering and accumulating in the internal void 37 of the mid-roller $50_i$. In other words, the shield 67 is configured to prevent this in that it interposes an obstacle dedicated to at least impeding (i.e., impeding or precluding) unwanted ground matter, such as mud, debris, water, etc., from entering and accumulating in the internal void 37 of the mid-roller $50_i$.

More particularly, in this example, the shield 67 is configured to block mud from accumulating in the internal void 37 of the mid-roller $50_i$. This may help to avoid or minimize mud buildup that may otherwise need to be drilled out before removing the mid-roller $50_i$ (e.g., for replacement or maintenance) and/or rust that may otherwise arise. Notably, in this example, the shield 67 is configured to protect against mud buildup over the fasteners $79_1$-$79_O$ in the openings $77_1$-$77_O$ of the hub portion 63 that interconnect the body 60 of the mid-roller $50_i$ to the hub 19. To achieve this, the shield 67 may be disposed to engage the flange $15_1$ of the rim portion 64 of the mid-roller $50_i$. Also, the shield 67 may improve a look of the mid-roller $50_i$. For instance, the shield 67 may replicate a look (e.g., a color, a texture, a pattern, etc.) of a given one of the driving wheel 42, the leading idler wheels $50_1$, $50_2$, the trailing idler wheels $50_7$, $50_8$, the track system $16_i$ and the vehicle 10.

In this embodiment, the shield 67 is removably attached to the body 60 of the mid-roller $50_i$. That is, the shield 67 is designed to enable it to be removed from (i.e., moved relative to or separated from) the body 60 of the mid-roller $50_i$. In this example, the shield 67 is detachably attached to the body 60 of the mid-roller $50_i$, i.e., designed to enable it to be detached from the body 60 of the mid-roller $50_i$ (e.g., to allow replacement of the shield 67 by another shield). In other examples, the shield 67 may be removably attached to the body 60 of the mid-roller $50_i$ so that it can move (e.g., lifted, pushed aside, or otherwise displaced) relative to the body 60 of the mid-roller $50_i$ while remaining connected to the body 60 of the mid-roller $50_i$.

Figure 21A:
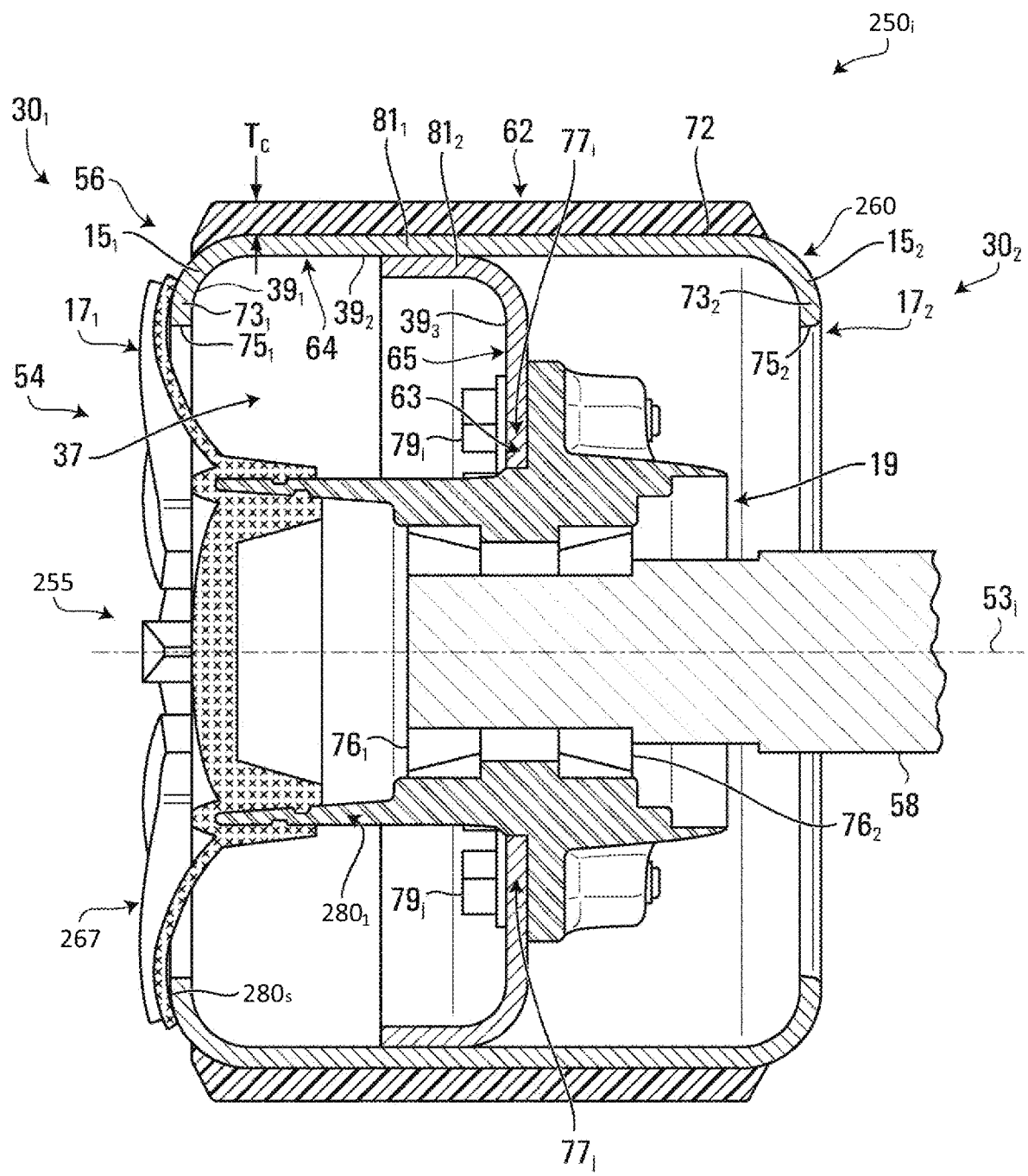
FIGS. 21A and 21B show variants of the mid-roller.

In this embodiment, the shield 67 is removably attached to the body 60 of the mid-roller $50_i$ fastenerlessly, i.e., without using any fastener to fasten the shield 67 to the body 60 of the mid-roller $50_i$. More specifically, the shield 67 may be removably attached to the body 60 of the mid-roller $50_i$ by being removably clipped to the body 60 of the mid-roller $50_i$. In this case, the shield 67 is removably clipped to the body 60 of the mid-roller $50_i$ by snap fit by a plurality of snap fitting portions $80_1$-$80_s$. To attach the shield 67 to the mid-roller $50_i$, the shield 67 may be aligned (manually or mechanically) with the mid-roller $50_i$ and pushed onto the lateral side $30_1$ of the mid-roller $50_i$. To detach the shield 67 from the mid-roller $50_i$, the shield 67 may be pulled upon and, optionally, snap fitting portions $80_1$-$80_s$ may need to be actuated to disengage the shield 67 from the mid-roller $50_i$. FIG. 21A is showing an alternative embodiment where the shield 267 is removably attached to the body 260 of the mid-roller $250_i$, at the hub portion 255, by a plurality of snap fitting portions $280_1$-$280_s$. In variants, the shield 67 and the body 60 of the mid-roller 50i may comprise threaded portions such that the male or female threaded portion of the shield 67 matches with the male or female threaded portion of the body 60 of the mid-roller 50i to attach the shield 67 to the body 60 of the mid-roller 50i.

Figure 21B:
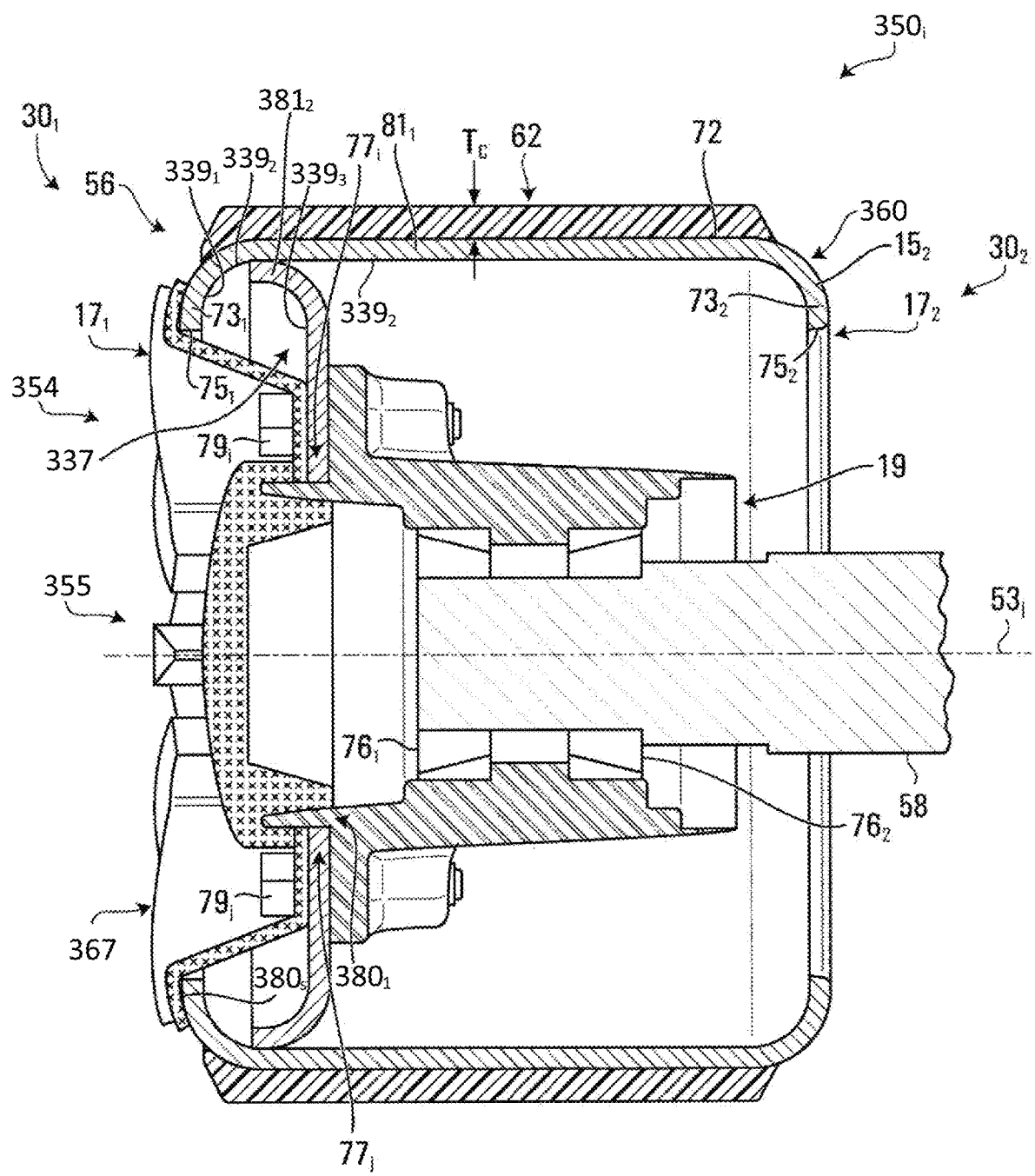

In other embodiments, the shield 67 may be removably attached to the body 60 of the mid-roller $50_i$ by being removably fastened to the body 60 of the mid-roller $50_i$ via at least one fastener. The fastener may be of any suitable kind. For instance, the fastener may be threaded fastener and there may be three or more fasteners fastening the shield 67 to the body 60 of the mid-roller $50_i$. In some cases, as shown in FIG. 21B, the shield 367 may be removably attached to the body 360 of the mid-roller $350_i$ by being removably fastened to the body 360 of the mid-roller $350_i$ via the fasteners $79_1$-$79_f$. In this example, the fasteners $79_1$-$79_f$ connect and affix the shield 367, the body 360 of the mid-roller $350_i$ and the hub 19 of the mid-roller $350_i$. To attach and detach the shield 367 to and from the body 360 of the mid-roller $350_i$, the threaded fasteners simply need to be fastened. In variants, the fastener may comprise glue, and so on. Still in the embodiment of FIG. 21B, a variant of the radially-extending portion 354 is shown. In addition to the fasteners $79_1$-$79_f$, the shield 367 is removably attached to the body 360 of the mid-roller $350_i$, at the hub portion 355, by a plurality of snap fitting portions $380_1$-$380_s$. The body 360 includes internal surfaces $339_1$-$339_3$ and the second one-piece component $381_2$ is secured to the first one-piece component $81_1$ closer to the internal surface $339_1$ such that the internal void 337 has a smaller volume compared to previously described embodiments.

Figure 14:
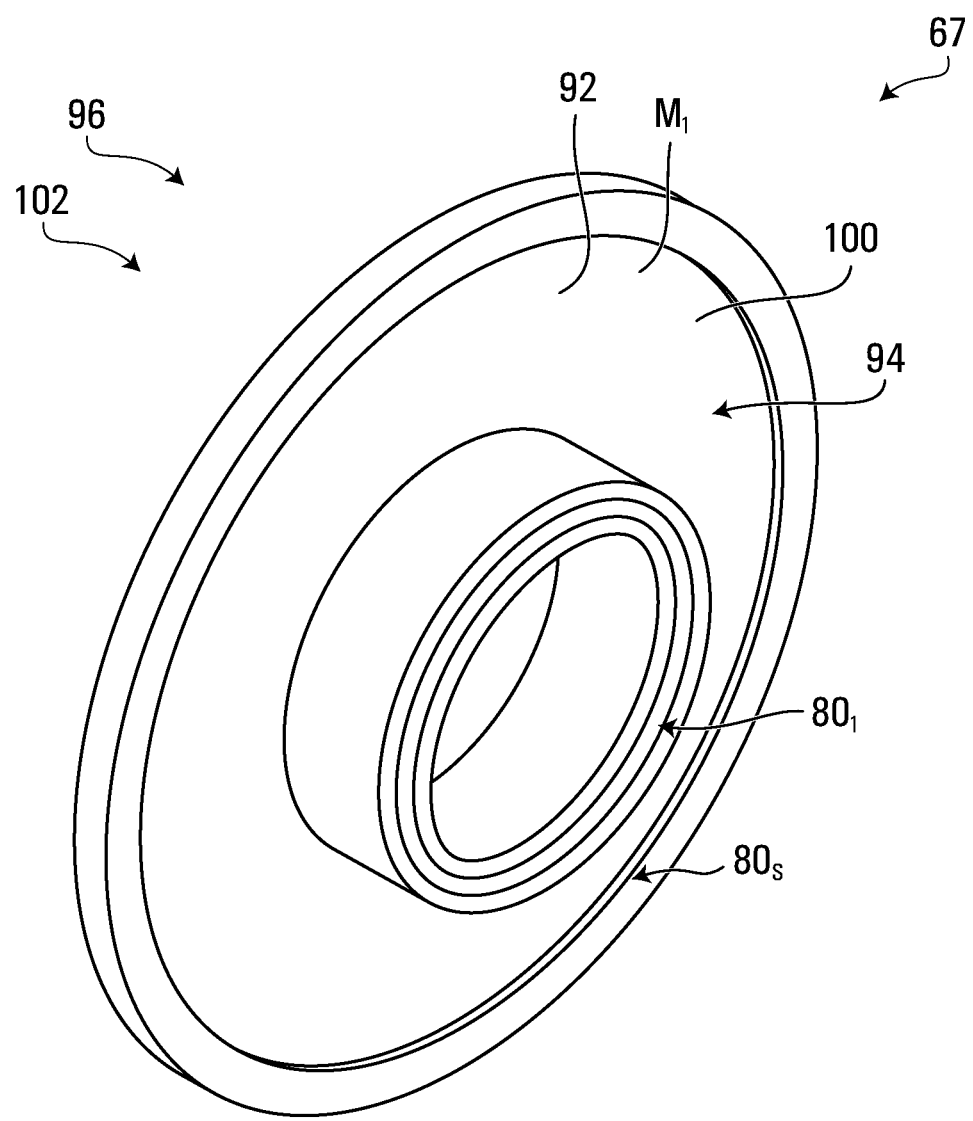
FIG. 14 shows a shield of the mid-roller.
Figure 15:
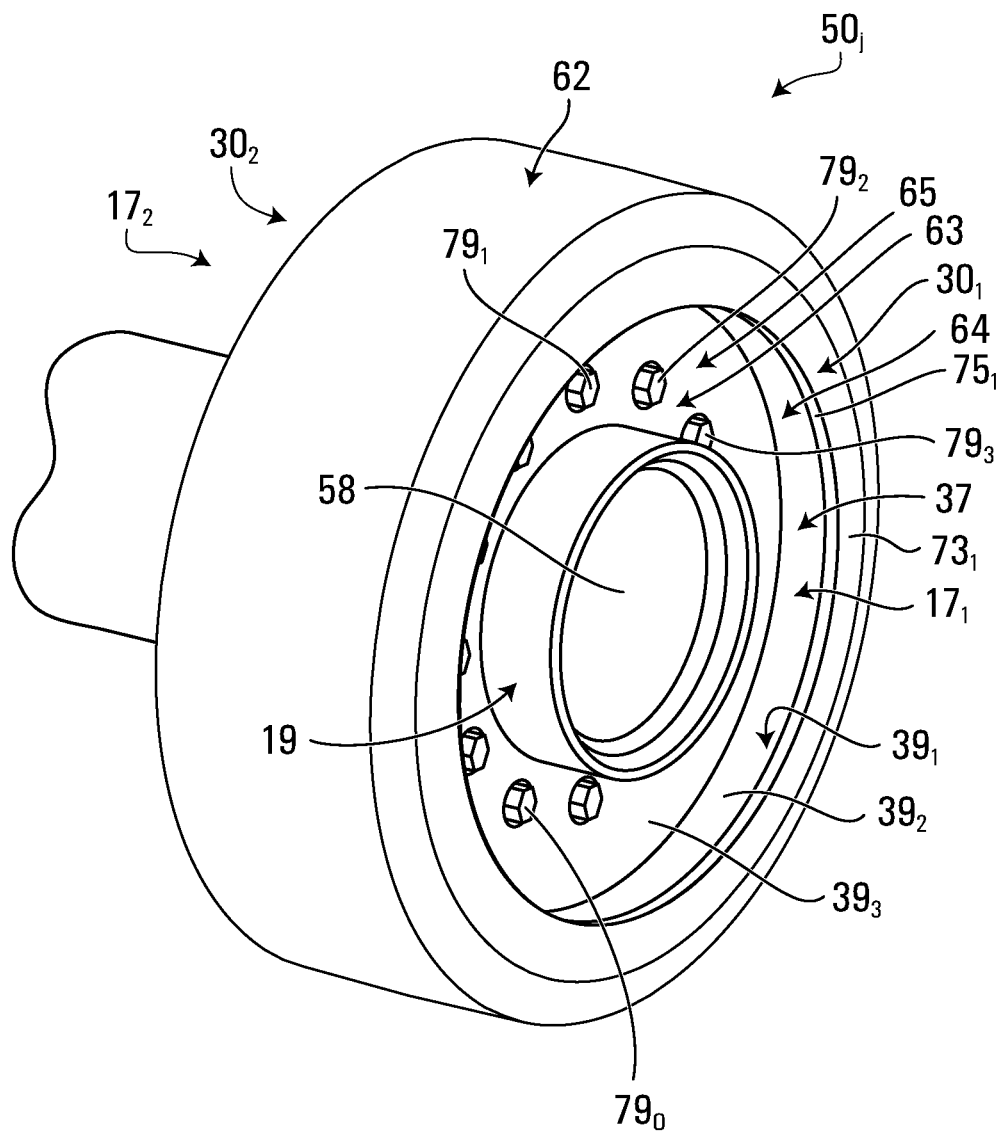
FIGS. 15 to 17 show a perspective view, a front view and a cross-sectional view of the mid-roller without the shield.
Figure 16:
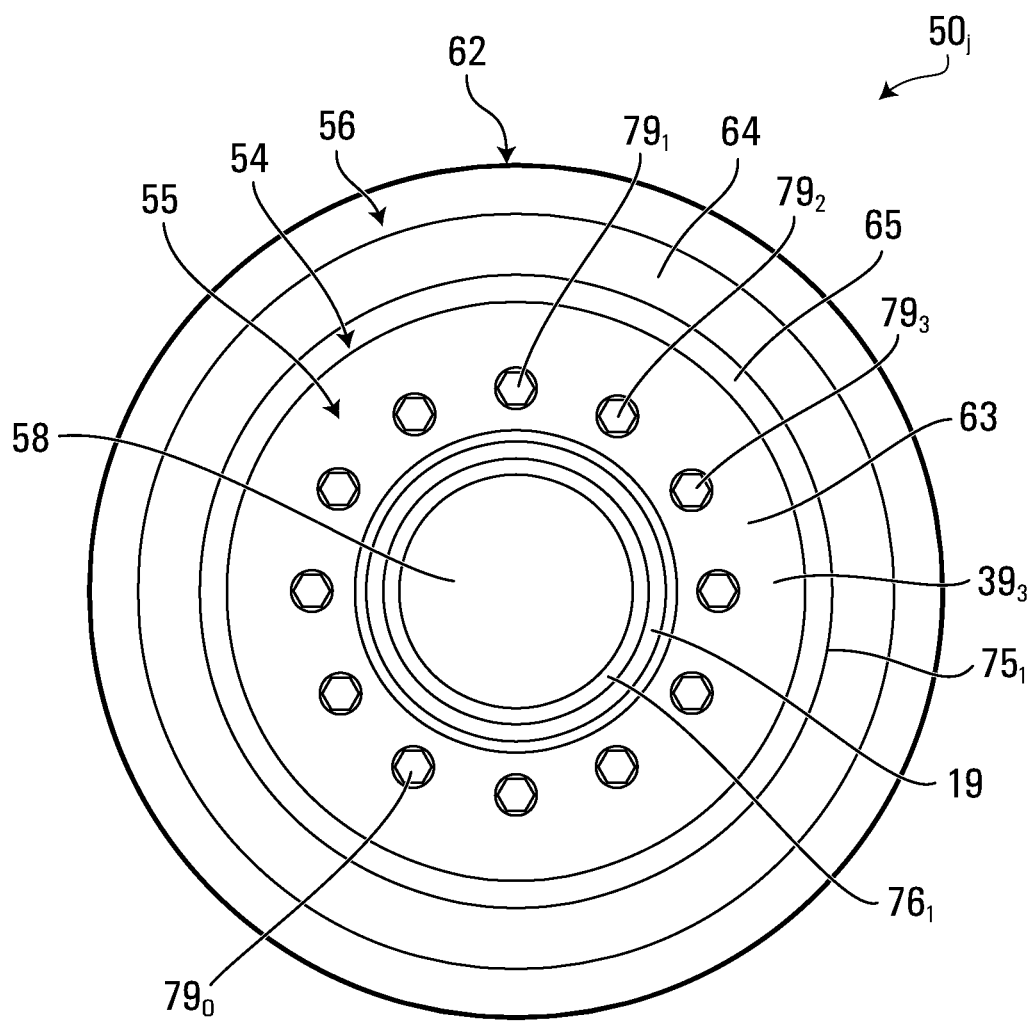
Figure 17:
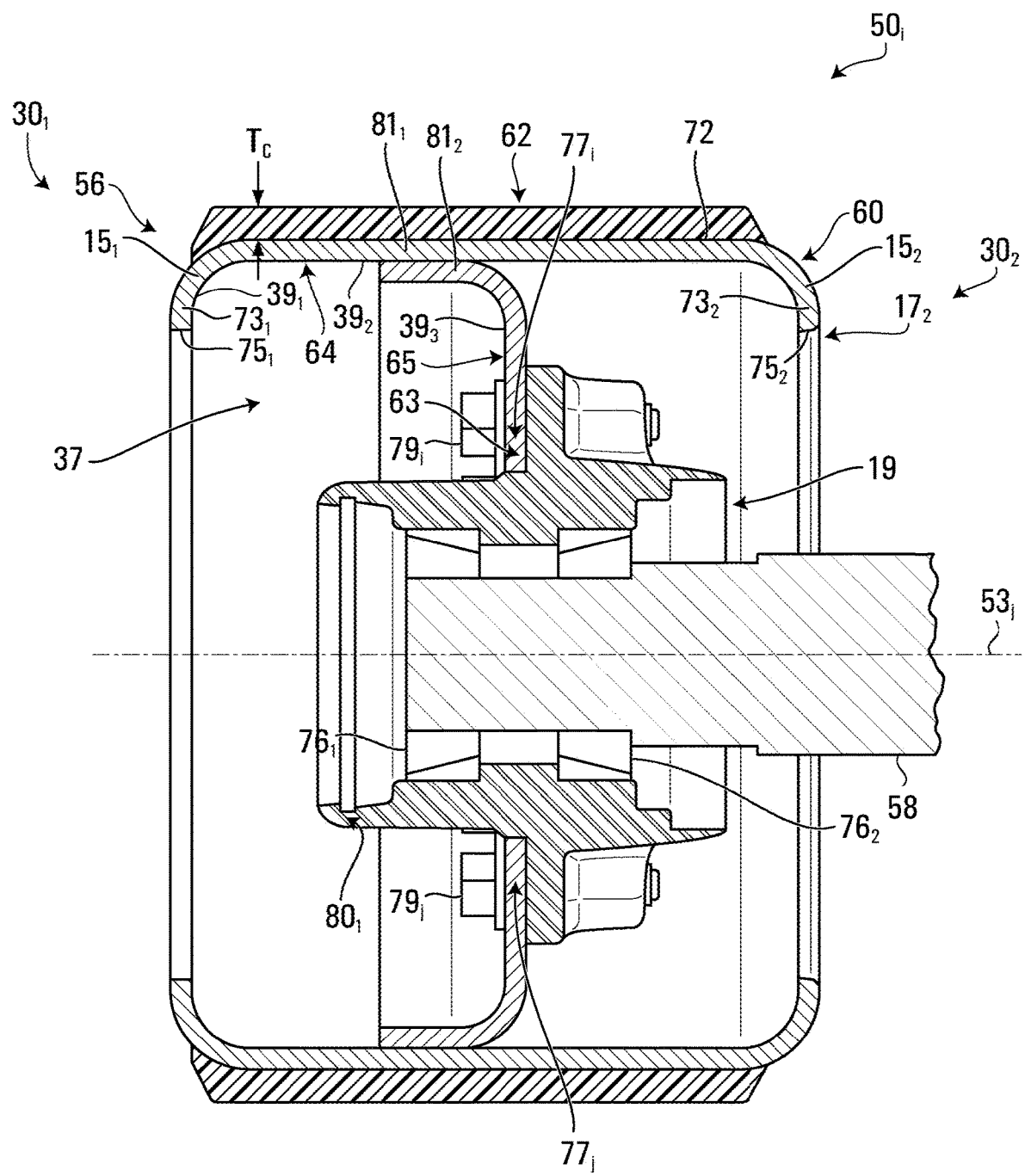
Figure 18:
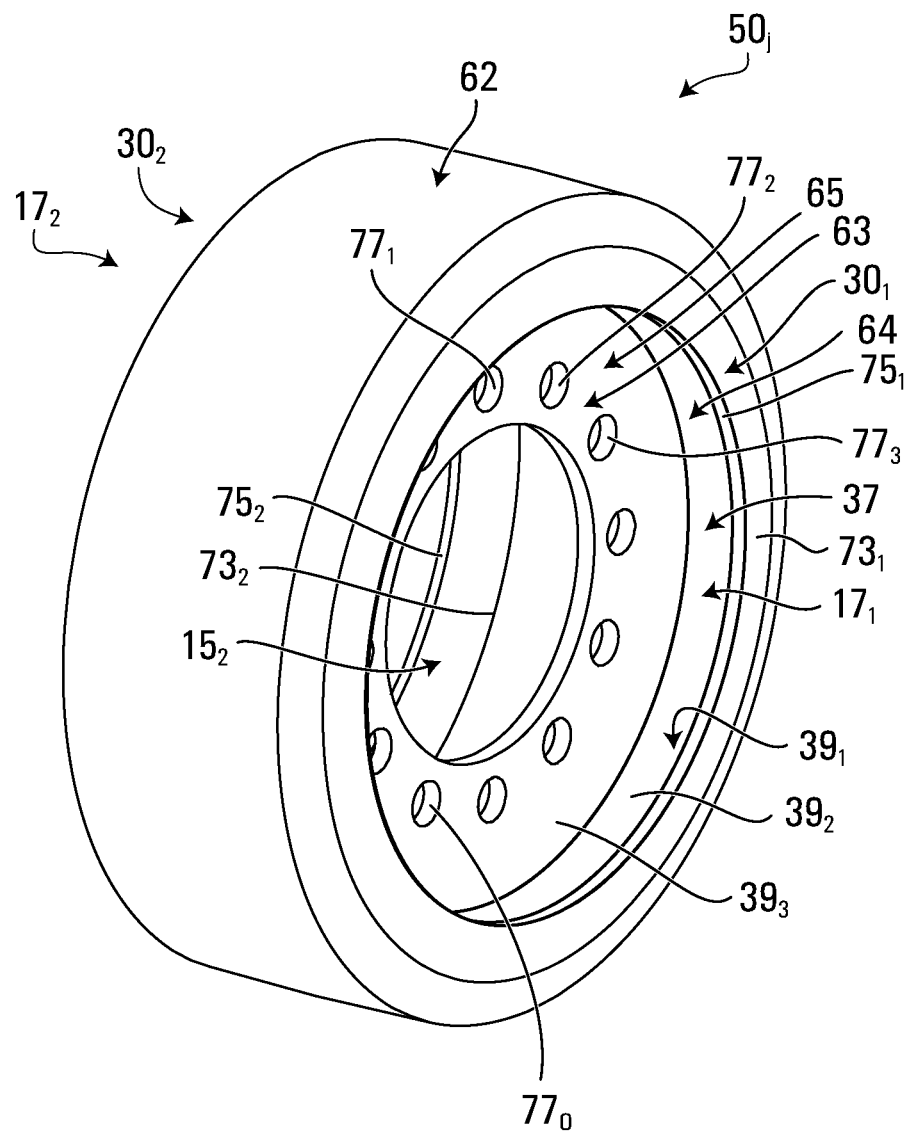
FIGS. 18 to 20 show perspective views and a cross-sectional view of the mid-roller without the shield and without an axle of the mid-roller.
Figure 19:
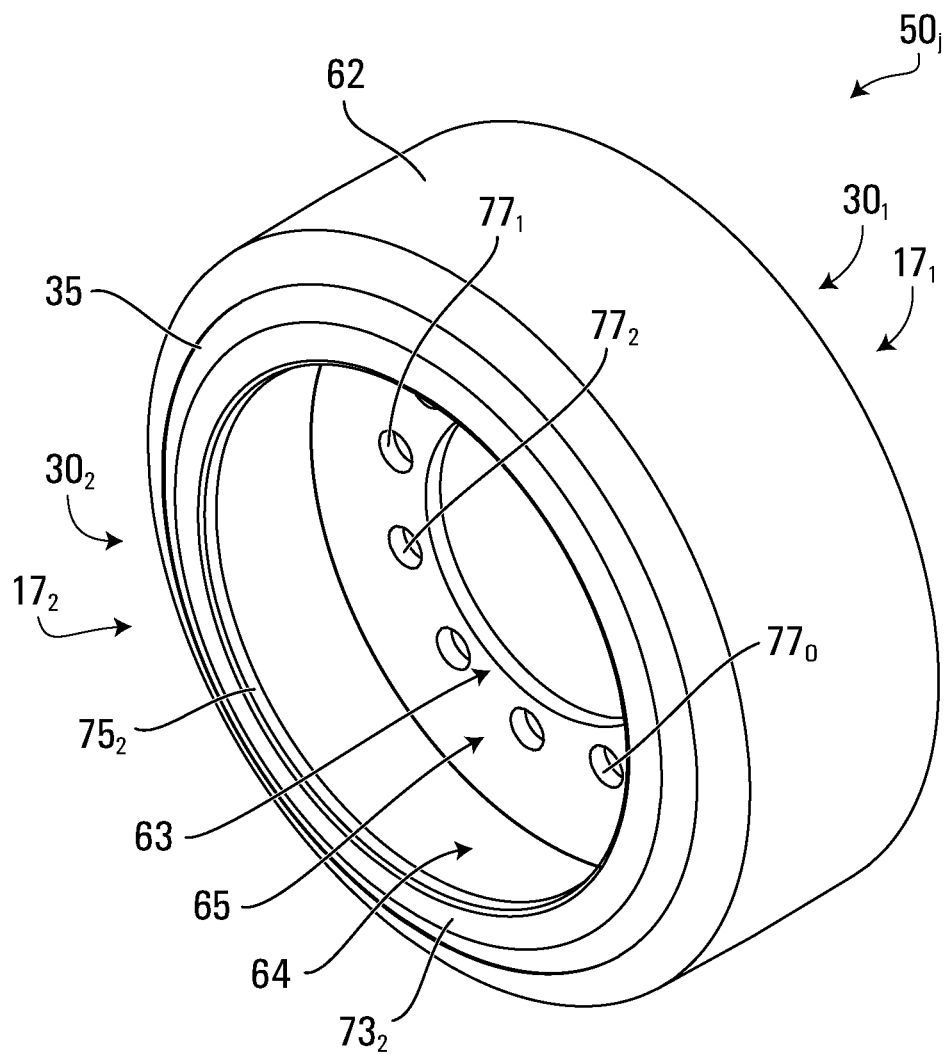
Figure 20:
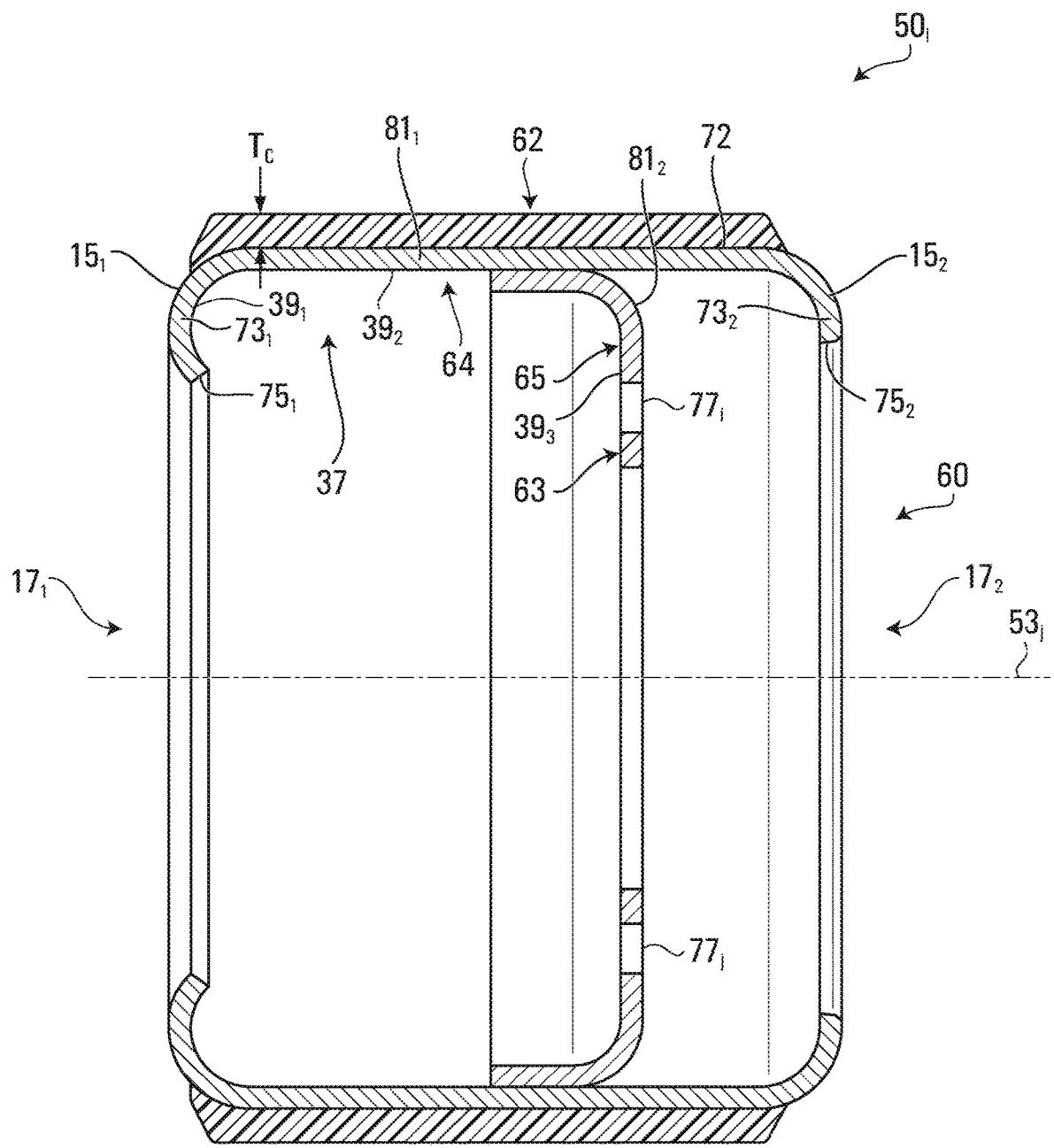

As shown in FIG. 14, a material 92 of the shield 67 may be different from the material of the body 60 of the mid-roller $50_i$ to provide a low cost, lightness, durability, impact resistance and/or the like to the shield 67. For instance, the material 92 of the shield 67 may be less rigid and less dense and have a greater elongation at break than the material of the body 60 of the mid-roller $50_i$.

The material 92 of the shield 67 may also have characteristics to enhance heat transfer between the mid-roller $50_i$ and its environment during use. More specifically, the material 92 may be configured for enhancing heat dissipation.

In some embodiments, the material 92 of the shield 67 may be a polymeric material and may include High Density Polyethylene (HDPE). The material 92 of the shield 67 may comprise a composite material, notably a fiber-reinforced polymeric material comprising a polymeric matrix and fibers disposed in the polymeric matrix.

The polymeric matrix may include any suitable substance (e.g., resin). For instance, in some examples, the polymeric matrix may include a thermoplastic or thermosetting resin, such as epoxy, polyethylene, polypropylene, acrylic, thermoplastic polyurethane (TPU), polyether ether ketone (PEEK) or other polyaryletherketone (PAEK), polyethylene terephthalate (PET), polyvinyl chloride (PVC), poly(methyl methacrylate) (PMMA), polycarbonate, acrylonitrile butadiene styrene (ABS), nylon, polyimide, polysulfone, polyamide-imide, self-reinforcing polyphenylene, polyester, vinyl ester, vinyl ether, polyurethane, cyanate ester, phenolic resin, etc., a hybrid thermosetting-thermoplastic resin, or any other suitable resin. In this embodiment, the polymeric matrix includes an epoxy resin.

The fibers may be made of any suitable material. In this embodiment, the fibers are carbon fibers. The material Mi is thus a carbon-fiber-reinforced plastic in this example of implementation. Any other suitable type of fibers may be used in other embodiments (e.g., polymeric fibers such as aramid fibers (e.g., Kevlar fibers), boron fibers, silicon carbide fibers, metallic fibers, glass fibers, ceramic fibers, etc.).

In some embodiments, the fibers may be continuous (e.g., may be provided as layers of continuous fibers (e.g. pre-preg (i.e., pre-impregnated) layers of fibers held together by an amount of matrix material, which is destined to provide a respective portion of the polymeric matrix). In other embodiments, the fibers may be chopped fibers interspersed in the polymeric matrix.

In other embodiments, the material 92 of the shield 67 may be non-polymeric, and may be for example a metallic material.

In this embodiment, the shield 67 comprises an inner side 94 and an outer side 96, the outer side 96 comprising an outer surface 102 and a plurality of projections projecting from the outer surface 102. The projections of the shield 67 include radial projections extending radially of the mid-roller 50$i$. The shield 67 also comprises a plurality of ventilation openings diminishing a weight of the shield 67 and increasing heat transfer between the mid-roller 50$_i$ and its environment.

Figure 22:
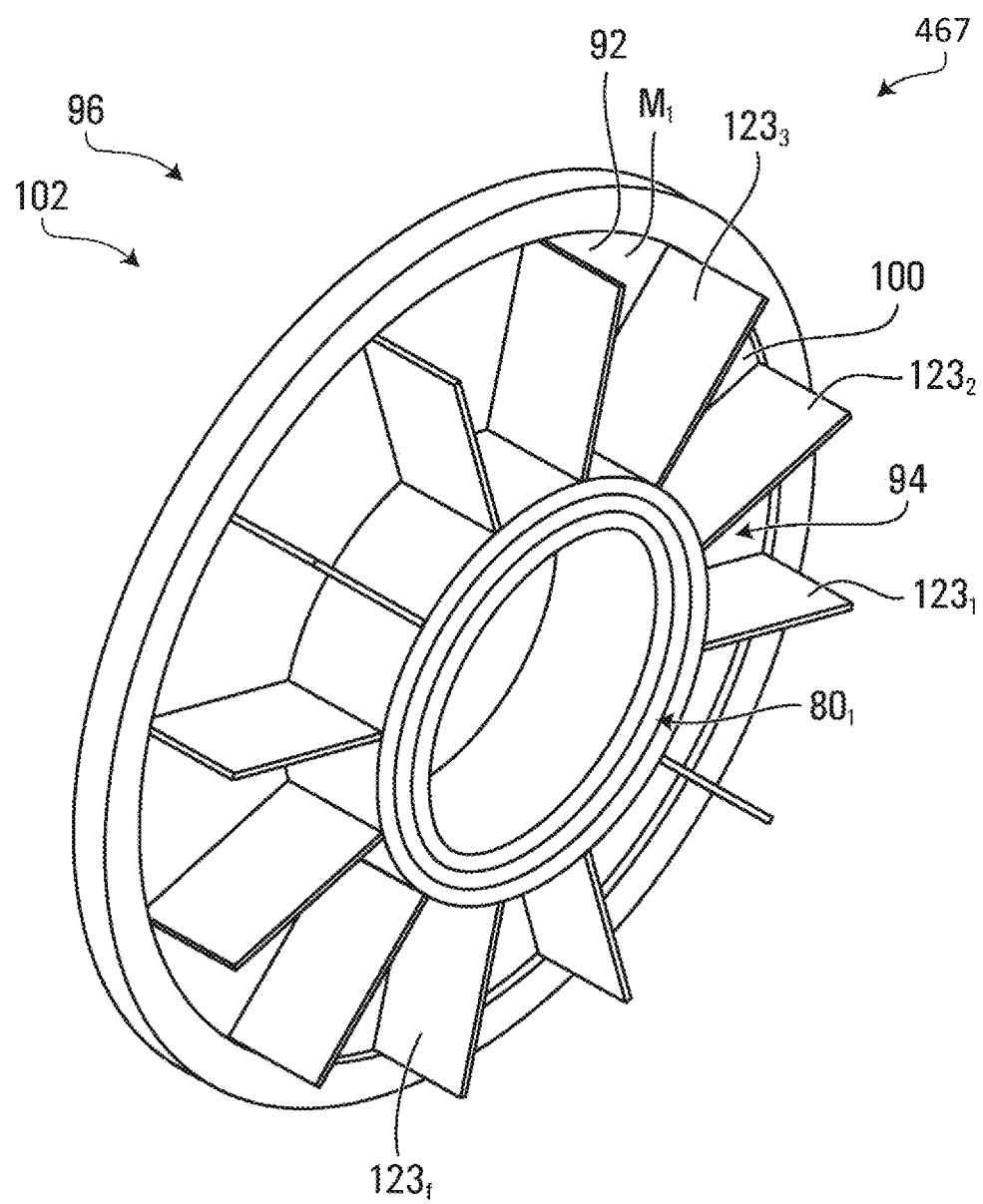
FIGS. 22 and 23 show variants of the shield.
Figure 23:
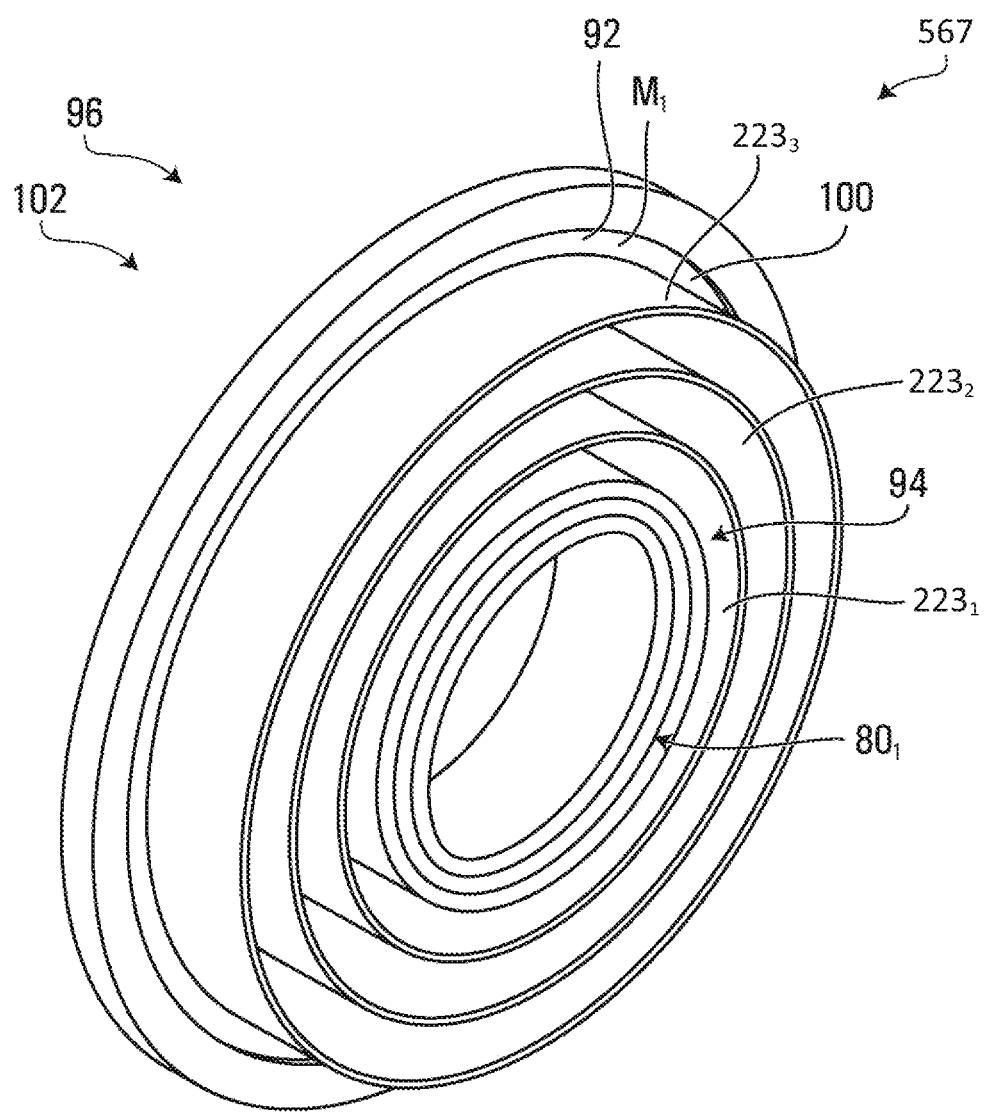

In other embodiments, as shown in FIG. 22, the inner side 94 may comprise an inner surface 100 comprising fins 123$_1$-123$_f$ to increase thermal conductivity of the shield 467. The fins 123$_1$-123$_f$ of the shield 467 may be extending radially as shown in FIG. 22. The fins 223$_1$-223$_3$ of the shield 567 may also extend tangentially as shown in FIG. 23, or may have any shape or pattern. In some embodiments, also, adding the shield 67 to the mid-roller 50$_i$ may improve thermal conductivity of the mid-roller 50$_i$, i.e., the mid-roller 50$_i$ may dissipate more heat under operation when the shield 67 is on the mid-wheel 50$_i$ than when the mid-roller 50$_i$ is free of any shield. For instance, a ratio of the heat dissipated by the mid-roller 50$_i$ when the shield is attached to the mid-roller 50$_i$ over the heat dissipated by the mid-roller 50$_i$ when the shield is not attached to the mid-roller 50$_i$ and the vehicle 10 advances at 10 km/h may be in some embodiments at least 1.02, in some embodiments at least 1.05, in some embodiments at least 1.1, in some embodiments even more. Also, a ratio RMR of an average temperature of the mid-roller 50$_i$ over an ambient temperature of the mid-roller 50$_i$ during operation may be less when the shield 67 is attached to the mid-roller 50$_i$ than when it is not attached to the mid-roller 50$_i$. For instance, in some embodiments, a ratio of the ratio RMR when the shield 67 is attached to the mid-roller 50$_i$ over the ratio RMR when no shield 67 is attached to the mid-roller 50$_i$ may be no more than 0.99, in some embodiments no more than 0.95, in some embodiments no more than 0.9, in some cases even less.

In some embodiments, the outer side 102 may comprise fins in a similar fashion to increase energy dissipation during use.

The shield 67 may provide a method for protecting the mid-roller 50$_i$ of the track system 16$_i$ of the vehicle 10 from mud build-up, especially in the internal void 37, by providing the shield 67 and removably attaching the shield 67 to the body 60 of the mid-roller 50$_i$ to protect against mud build-up in the body 60 of the mid-roller 50$_i$, especially in the internal void 37, and over the fasteners 79$_1$-79$_f$. Inversely, a method for servicing the mid-roller 50$_i$ of the track system 16$_i$ of the vehicle 10 may include the steps of: removing the shield 67 from the mid-roller 50$_i$; accessing the internal void 37 of the body 60 of the mid-roller 50$_i$; and unfastening the fasteners 79$_1$-79$_o$ from the hub portion 63 of the body 60 of the mid-roller 50$_i$.

The track system 16$_i$, including the mid-roller 50$_i$ and its shield 67, may be implemented in various other ways in other embodiments.

For example, in some embodiments, the body 60 of the mid-roller 50$_i$ may be implemented in any other suitable way in other embodiments.

Figure 24:
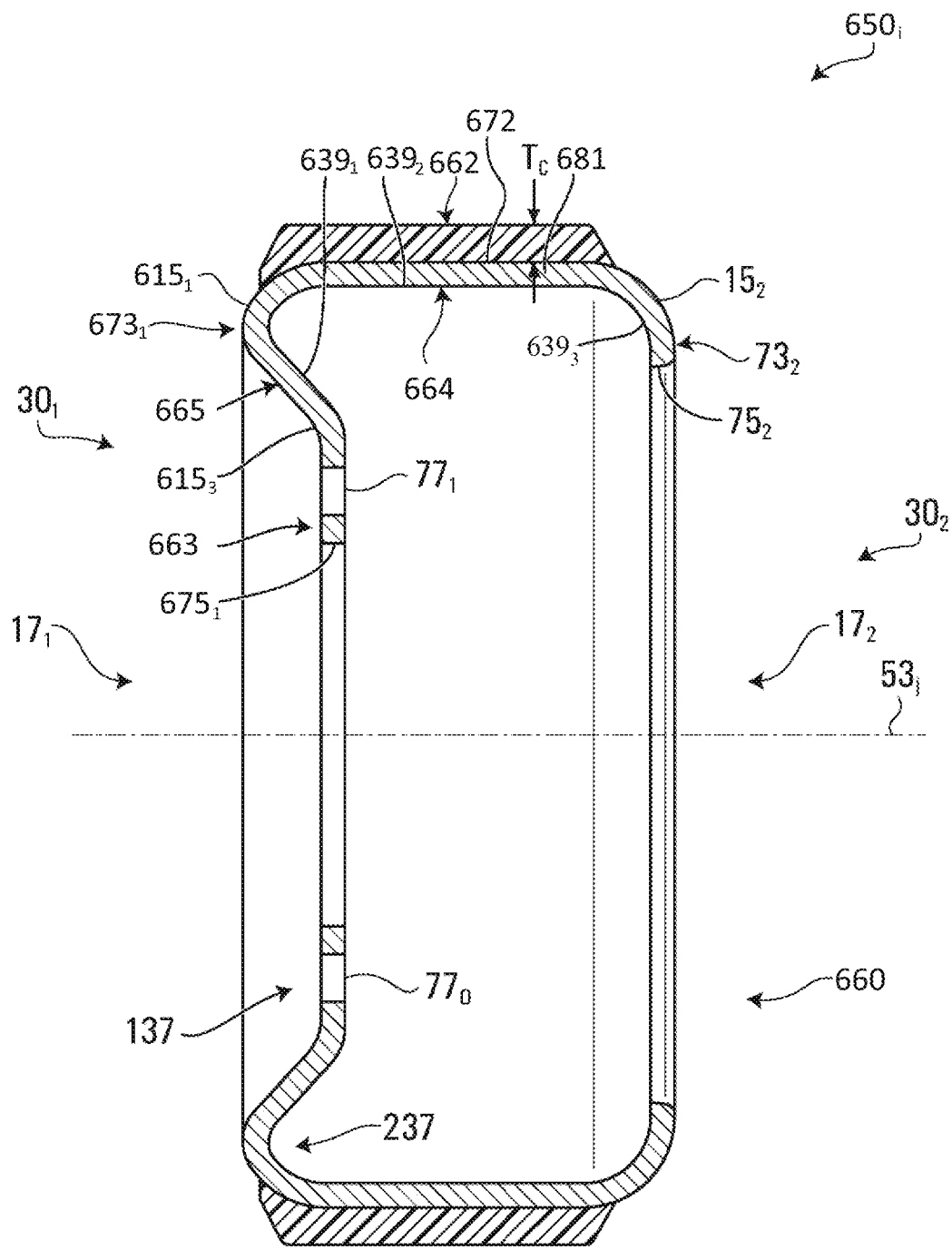
FIGS. 24 and 25 show variants of the mid-roller.

For instance, in some embodiments, as shown in FIG. 24, the rim portion 664, the hub portion 663 and the radially-extending portion 665 of the body 660 of the mid-roller 650$_i$ may constitute a one-piece component 681. In this example, the body 660 of the mid-roller 650$_i$ may be viewed as a "single piece" body. In this example, the radially-extending portion 665 of the body 660 extends radially inwardly from the shoulder 615$_1$ of the body 660 of the mid-roller 650$_i$ and connects the hub portion 663 to the rim portion 664. As such, the radially-extending portion 665 and the hub portion 663 of the body 660 with its edge 675$_1$ are part of the flange 673$_1$. The body 660 includes the circumferential surface 672 and the covering 662 between the shoulder 615$_1$ and the shoulder 152. In this example, the angle defined by the shoulder 615$_1$ is less than 90 degrees such that the radially-extending portion 665 of the body 660 creates a recess 137 and the body 660 of the mid-roller 650$_i$ comprises a shoulder 615$_3$ such that the inner and outer surfaces of the hub portion 663 of the body 660 are substantially perpendicular to the axis 53$_i$ of the mid-roller 650$_i$. The shield 667 thus prevent mud build-up in both recesses 237, 137, the recess 237 being in this case behind the portions 663, 665. The recesses 237 are delimited by the internal surfaces 639$_1$ and 639$_2$.

In this embodiment, the body 660 of the mid-roller 650$_i$ may be manufactured by punching, blanking, stamp shaping, machining, curling, punching, marking and/or blasting. For instance, a sheet of material may be punched and/or blanked to create a hole corresponding to the dimensions of the hub portion 663. The sheet of material may then be stamped to impart a shape to the sheet of material, the shape generally corresponding to the shape of the body 660. The edges of the stamped sheet of material may be machined to provide more precise dimensions to the body 660. The stamped, machined sheet may be then be curled to form the flanges 673$_1$-73$_2$ and punched to form the openings 77$_1$-77$_o$ of the hub portion 663. The sheet of material may be marked and blasted, for instance by sand or by any other suitable material, in order to have a surface finish that will increase durability of the component. Although in this embodiment the above-described steps are performed in the recited order to manufacture the body 660 of the mid-roller 650$_i$, in other embodiments, the above-described steps may be performed in a different order and additional steps may also be performed to manufacture the body 660 of the mid-roller 650$_i$.

Figure 25:
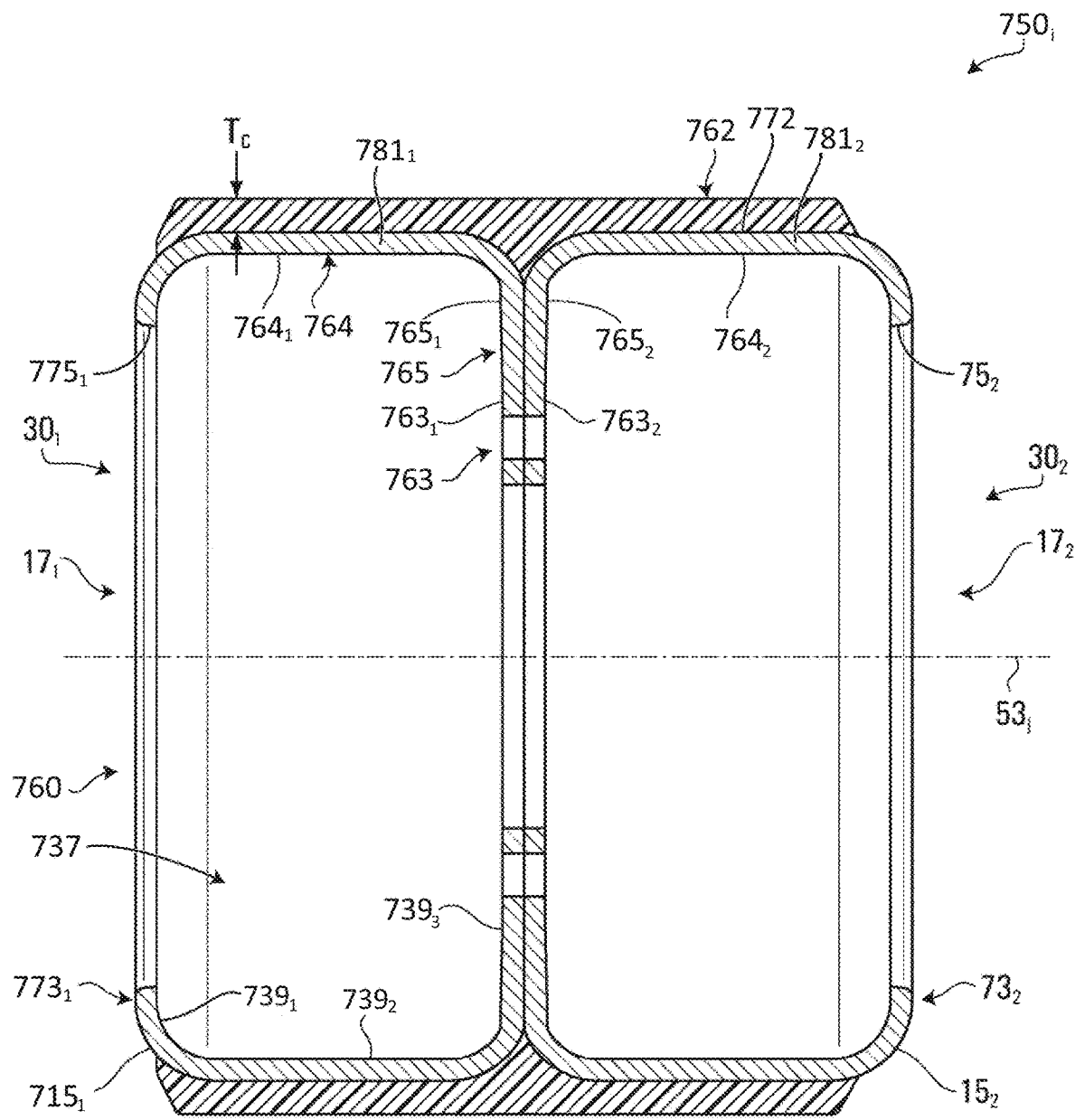

In some embodiments, as shown in FIG. 25, the body 760 of the mid-roller 750$_i$ comprises two one-piece components 781$_1$, 781$_2$ affixed to one another (e.g., by welding), each of the two components 781$_1$, 781$_2$ forming a part of the rim portion 764, the hub portion 763 and the radially-extending portion 765 of the body 760. That is, the one-piece component 781$_1$ comprises a rim portion 764$_1$, a hub portion 763$_1$ and a radially-extending portion 765$_1$; the one-piece component 781$_2$ comprises a rim portion 764$_2$, a hub portion 763$_2$ and a radially-extending portion 765$_2$; the rim portions 764$_1$, 764$_2$ are part of the rim portion 764; the hub portions 763$_1$, 763$_2$ are part of the hub portion 763; and the radially-extending portions 765$_1$, 765$_2$ are part of the radially-extending portion 765. In this example, the body 760 of the mid-roller 750$_i$ may be viewed as a "twin halves" body. In this example, the edge 775$_1$ and the flange 773$_1$ are formed by the one-piece component 781$_1$ and the flange 73$_2$ is formed by the one-piece component 781$_2$. In this example, also, the one-piece components 781$_1$, 781$_2$ are identical components that are welded to one another, such that the body 760 of the mid-roller 750$_i$ is symmetrical relative to a plane perpendicular to the axis 53$_i$ and located between the one-piece components 781$_1$, 781$_2$. The body 760 includes the circumferential surface 772 and the covering 762 between the shoulder $715_1$ and the shoulder $15_2$. The internal void 737 is defined by the internal surfaces $739_1$, $739_2$ and $739_3$.

In this embodiment, the body 760 of the mid-roller $750_i$ may be manufactured in a similar manner as a "single piece" body, but additional manufacturing steps may be required. The additional steps for assembling the one-piece components $781_1$, $781_2$ may include, for instance, welding the one-piece components $781_1$, $781_2$ to one another and blasting the assembly, for instance by sand or by any other suitable material, in order to have a surface finish that will increase durability of the component.

Figure 28:
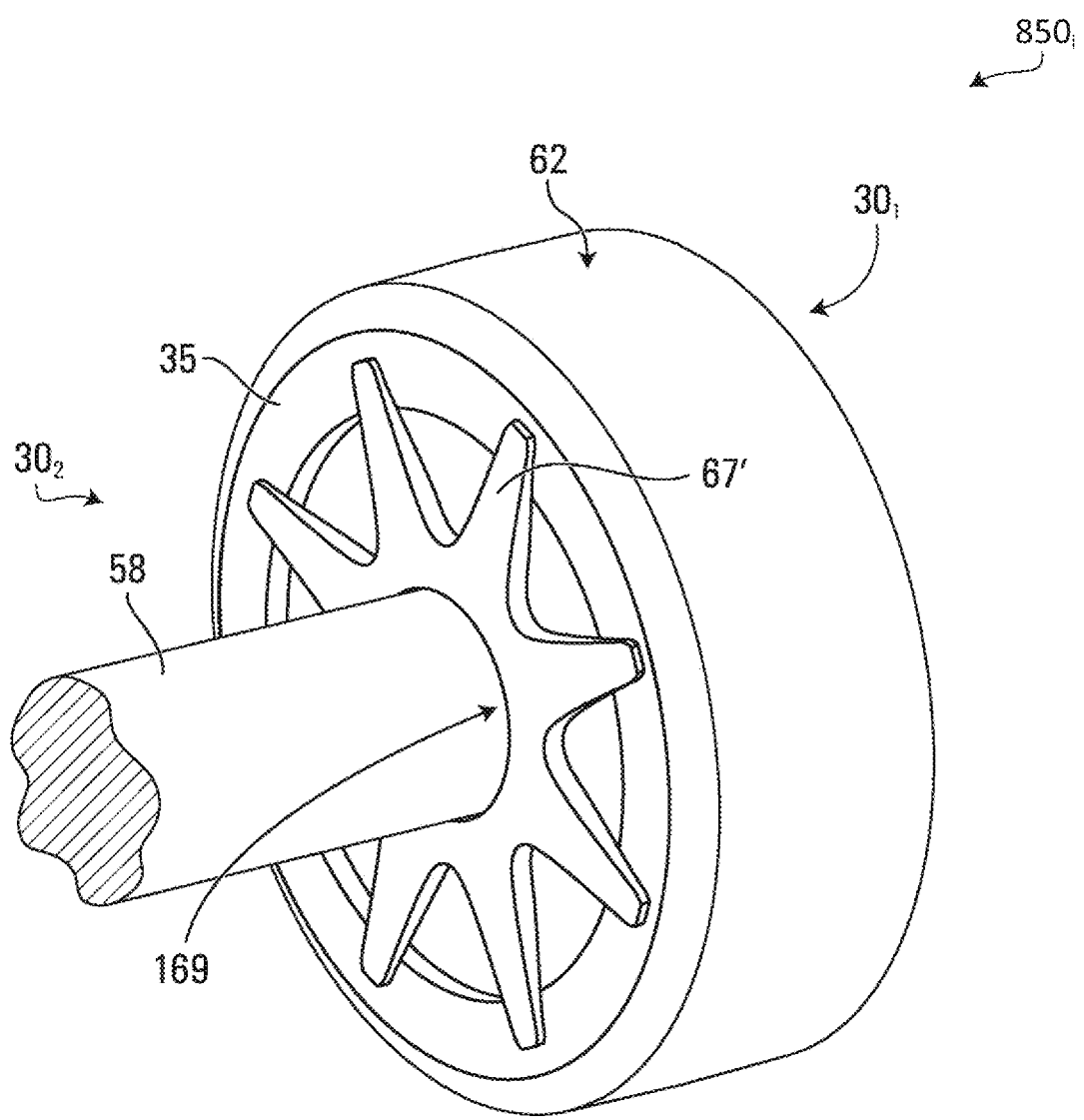
FIG. 28 shows a variant of the mid-roller.

In some embodiments, as shown in FIG. 28, the shield 67 may be mounted on the lateral side $30_1$ of the mid-roller $850_i$, while another shield 67' similar to the shield 67 may be mounted on the lateral side $30_2$ of the mid-roller $850_i$. In this embodiment, the shield 67' of the lateral side $30_2$ of the mid-roller $850_i$ may be similar to the shield 67 of the side $30_1$ of the mid-roller $850_i$, but may additionally comprise an aperture 169 configured for being occupied by the axle 58 which connects hub 19 of the mid-roller $850_i$.

Figure 29:
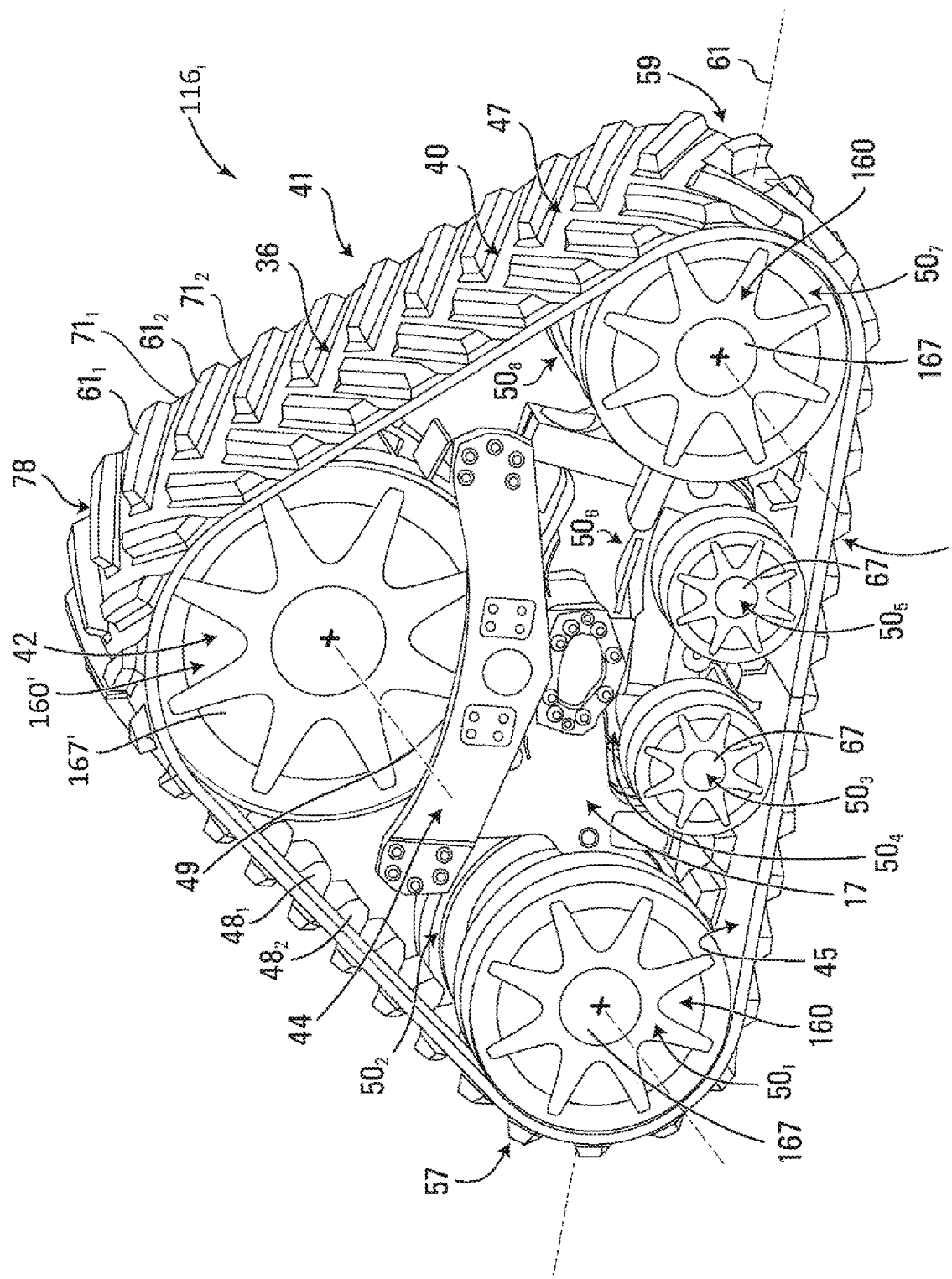
FIG. 29 shows a variant of the track system.

In some embodiments, as shown in FIG. 29 showing an embodiment of the track system 116, a shield 167 similar to the shield 67 may be mounted to a body 160 of a given one of the leading idler wheels $50_1$, $50_2$ and the trailing idler wheels $50_7$, $50_8$. Also, in some embodiments, a shield 167' similar to the shield 67 may be mounted to a body 160' of the drive wheel 42.

Figure 30A:
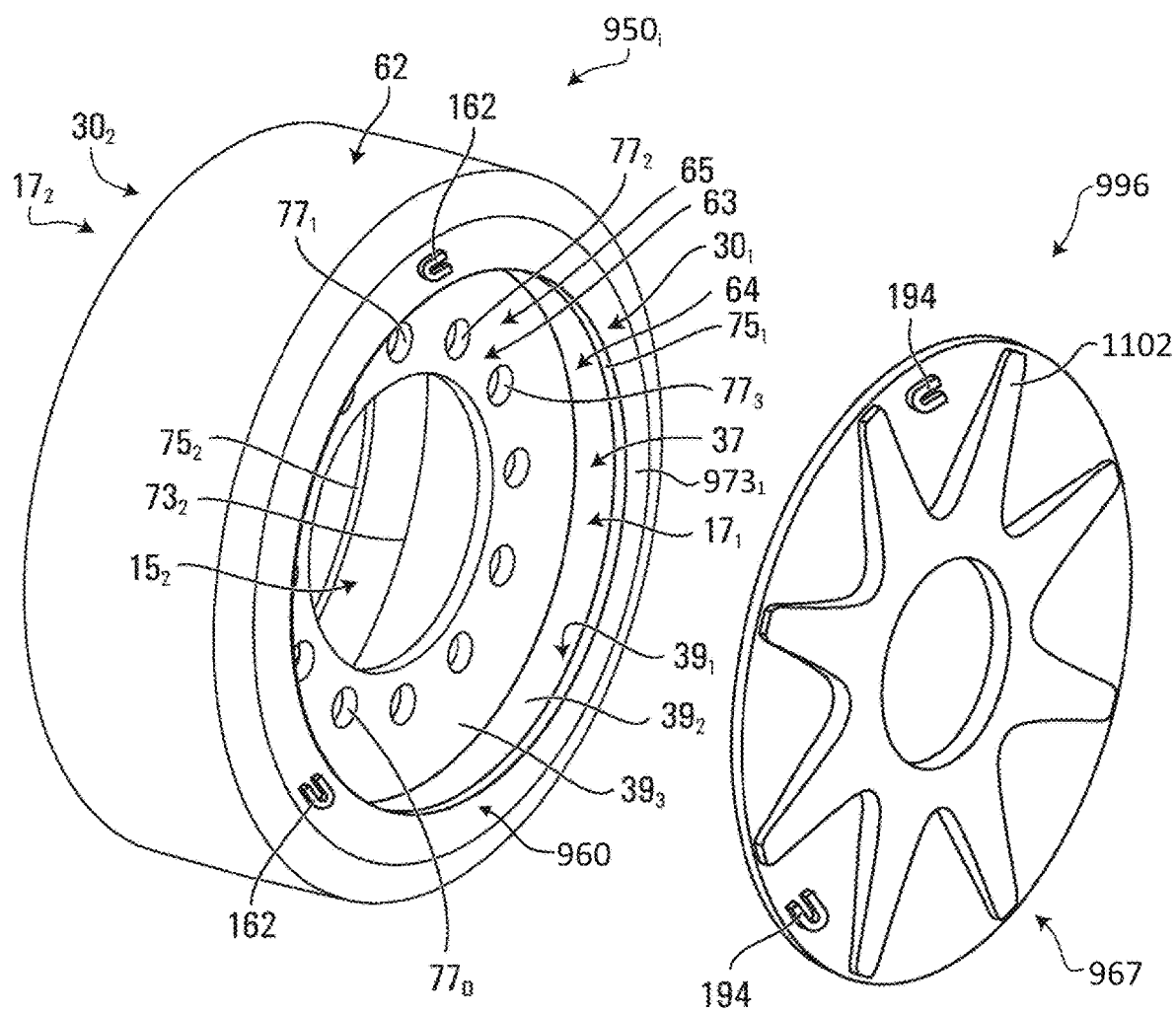
FIGS. 30A and 30B show a variant of the track system.
Figure 30B:
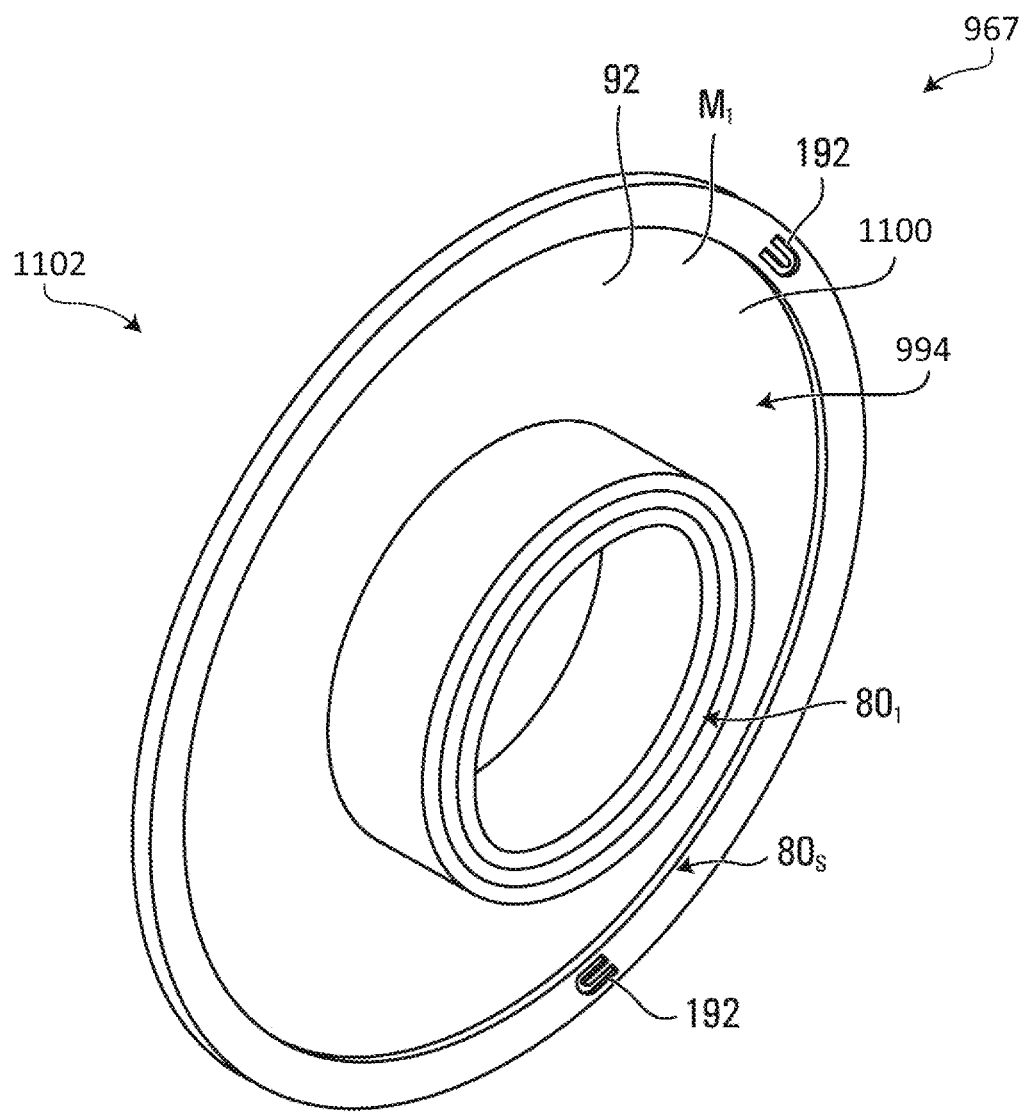

In some embodiments, as shown in FIGS. 30A and 30B, the mid-roller $950_i$ and its shield 967 are configured such that the body 960 of the mid-roller $950_i$ can only accommodate the specific shield 967 (i.e., preclude differently-configured shields from being mounted to the body 960 of the mid-roller $950_i$). The body 960 of the mid-roller $950_i$ and the shield 967 are configured to exclusively work with one another. For instance, the mid-roller $950_i$ and its shield 967 may have one or more specific features (e.g., shapes, such as a specific combination of projections and recesses that can register with one another) such that the body 960 of the mid-roller $950_i$ can only work with the shield 967. In this example, the body 960 of the mid-roller $950_i$ comprises projections 162 on the flange 9731 and the inner surface 1100 of the inner side 994 of the shield 967 comprises recesses 192 configured to match the projections 162 of the body 960 when the shield 967 is in place. The projections 162 of the body 960 may impart projections 194 on the outer surface 1102 of the outer side 996 of the shield 967, on a backside of the recesses 162. In a variant, the outer surface 1102 of the outer side 996 of the shield 967 may be free of projections of any kind on the backside of the recesses 162. In other embodiments, instead of or in addition to having projections matching with recesses, the mid-roller $950_i$ and its shield 967 may comprise any arrangement of voids, fastener, clips, such that the mid-roller $950_i$ can only accommodate the specific shield 967.

Although the agricultural vehicle 10 illustrated in FIG. 1 is an agricultural tractor comprising four track systems $16_1$-$16_4$, different types of agricultural vehicles configured differently (e.g., having a different number of track systems) may implement improvements based on principles disclosed herein.

Figure 31:
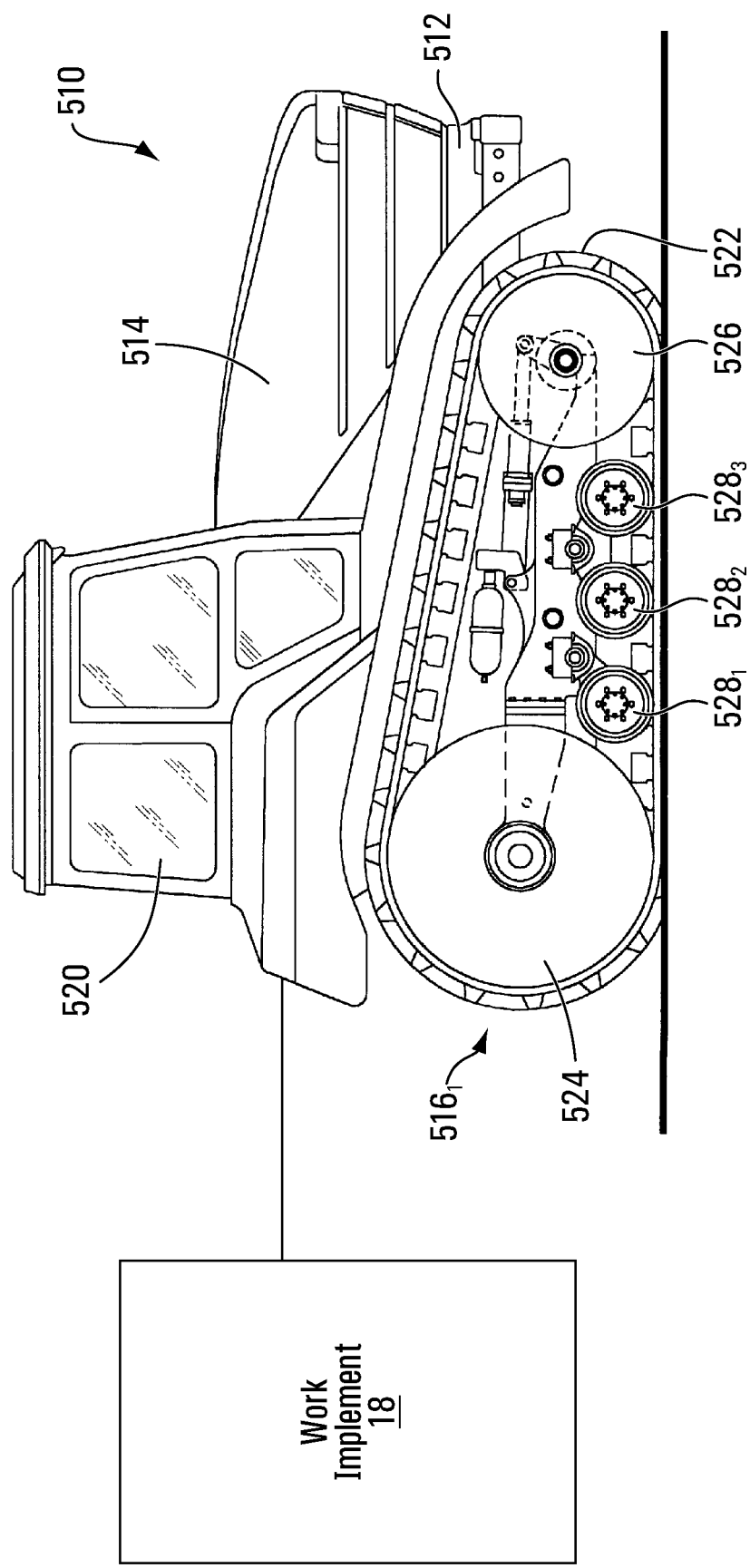
FIG. 31 shows an example of an agricultural vehicle comprising two track systems.

For instance, with additional reference to FIG. 31, an agricultural vehicle 510 may be provided comprising two track systems $516_1$, $516_2$ rather than four (i.e., one track system $516_i$ at each side of the agricultural vehicle 510). The agricultural vehicle 510 also comprises a frame 512, a prime mover 514, and an operator cabin 520 and can be equipped with the work implement 18 to perform agricultural work. Each track system $516_i$ comprises a drive wheel 524 at a first longitudinal end portion of the track system $516_i$, an idler wheel 526 at a second longitudinal end portion of the track system $516_i$ opposite to the first longitudinal end portion, and a plurality of roller wheels $528_1$-$528_6$ intermediate the drive wheel 524 and the idler wheel 526. The track system $516_i$ further comprises a track 522 disposed around the wheels 524, 526, $528_1$-$528_6$ and driven by the drive wheel 524. The track system $516_i$ may implement the lateral load distribution mechanism 100 as described in section 1 above. Additionally or alternatively, the track 522 may be configured in a manner similar to the track 22 as described in section 2 above.

Figure 32:
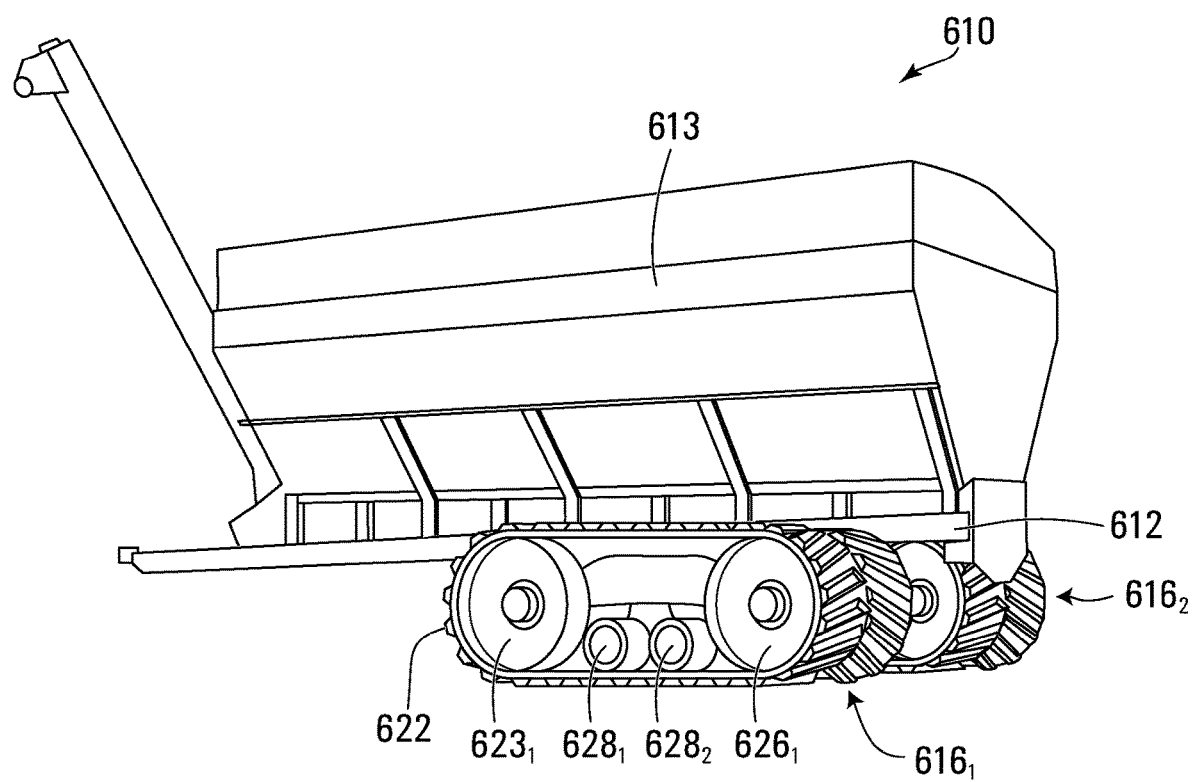
FIG. 32 shows an example of a trailed vehicle configured to be attached to the agricultural vehicle of FIG. 1 or 31.

In some embodiments, the work implement 18 that is drawn by the agricultural vehicle 10 may implement features disclosed herein in respect of the agricultural vehicle 10, including wheels such as the mid-roller $50_i$ and its shield 67. For instance, with additional reference to FIG. 32, the work implement 18 may comprise a trailed vehicle 610 (e.g., a cart) comprising a frame 612, a trailer body 613 (e.g., a container) and track systems $616_1$, $616_2$. In this example, the trailed vehicle 610 is a harvest cart. In other examples, the trailed vehicle 610 may be a fertilizer cart, a sprayer, a planter or any other suitable type of trailed vehicle. Each track system $616_i$ of the trailed vehicle 610 comprises front (i.e., leading) idler wheels $623_1$, $623_2$ at a first longitudinal end portion of the track system $616_i$, rear (i.e., trailing) idler wheels $626_1$, $626_2$ at a second longitudinal end portion of the track system $616_i$ opposite the first longitudinal end portion, and a plurality of roller wheels $628_1$-$628_4$ intermediate the front idler wheels $623_1$, $623_2$ and the rear idler wheels $626_1$, $626_2$. The track system $616_i$ further comprises a track 641 disposed around the wheels $626_1$, $626_2$, $626_1$, $626_2$, $628_1$-$628_4$. One or more of the wheels $626_1$, $626_2$, $626_1$, $626_2$, $628_1$-$628_4$ may comprises a body and a shield similar to the body 60 and the shield 67 of the mid-roller $50_i$ as described above.

In this example, the trailed vehicle 610 is not motorized in that it does not comprise a prime mover for driving the track systems $616_1$, $616_2$. Rather, the trailed vehicle 610 is displaced by the agricultural vehicle 10 to which the trailed vehicle 610 is attached. However, in some examples, the trailed vehicle 610 may be motorized. That is, the trailed vehicle 610 may comprise a prime mover for driving a drive wheel of each track system $616_i$. For example, instead of comprising rear idler wheels $626_1$, $626_2$, the track system $616_i$ may comprise a drive wheel for driving the track 622.

While in embodiments considered above the vehicle 10 is an agricultural vehicle, in other embodiments, the vehicle 10 may be an industrial vehicle such as a construction vehicle (e.g., a loader, a telehandler, a bulldozer, an excavator, etc.) for performing construction work or a forestry vehicle (e.g., a feller-buncher, a tree chipper, a knuckleboom loader, etc.) for performing forestry work, a military vehicle (e.g., a combat engineering vehicle (CEV), etc.) for performing military work, an all-terrain vehicle (ATV), a snowmobile, or any other vehicle operable off paved roads. Although operable off paved roads, the vehicle 10 may also be operable on paved roads in some cases.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A wheel for a track system of a vehicle, the track system comprising a track-engaging assembly that includes the wheel and a track movable around the track-engaging assembly, the track being elastomeric to flex around the track-engaging assembly, the wheel comprising:
   a body comprising a rim portion, a hub portion, and a radially-extending portion between the rim portion and the hub portion, the body of the wheel defining an internal void; and
   a shield removably attached to the body of the wheel at least with a snap fitting portion projecting from an inner surface of the shield, and configured to protect against mud buildup in the internal void of the body of the wheel, wherein fins project from the inner surface of the shield towards the body, and wherein at least one of the fins projects from the snap fitting portion to an outer perimeter radial section of the inner surface.

2. The wheel of claim 1, wherein: the hub portion of the body of the wheel comprises openings to receive fasteners for fastening the hub portion of the body of the wheel to a hub; and the shield is configured to protect against mud buildup over the fasteners.

3. The wheel of claim 1, wherein the shield is removably attached to the body of the wheel by being removably clipped to the body of the wheel.

4. The wheel of claim 1, wherein the shield is removably attached to the body of the wheel fastenerlessly.

5. The wheel of claim 1, wherein at least part of the body of the wheel is stamped.

6. The wheel of claim 5, wherein the rim portion of the body of the wheel is stamped.

7. The wheel of claim 5, wherein the hub portion and the radially-extending portion of the body of the wheel are stamped.

8. The wheel of claim 1, wherein: the rim portion of the wheel is a first one-piece component; and the hub portion and the radially-extending portion of the body of the wheel constitute a second one-piece component secured to the first one-piece component.

9. The wheel of claim 8, wherein the second one-piece component is welded to the first one-piece component.

10. The wheel of claim 1, wherein the rim portion of the wheel comprises a circumferential surface and a shoulder turning radially inwardly to form a flange such that an edge of the flange of the rim portion of the wheel is located radially inward of the circumferential surface of the rim portion of the wheel.

11. The wheel of claim 10, wherein: the shoulder of the rim portion of the wheel is a first shoulder; the flange of the rim portion of the wheel is a first flange; and the rim portion of the wheel comprises a second shoulder turning radially inwardly to form a second flange such that an edge of the second flange of the rim portion of the wheel is located radially inward of the circumferential surface of the rim portion of the wheel.

12. The wheel of claim 10, wherein the shield is disposed to engage the flange of the rim portion of the wheel.

13. The wheel of claim 1, wherein a material of the shield is different from a material of the body of the wheel.

14. The wheel of claim 13, wherein the material of the shield is less rigid than the material of the body of the wheel.

15. The wheel of claim 13, wherein the material of the shield is a polymeric material and the material of the body of the wheel is a metallic material.

16. The wheel of claim 15, wherein the polymeric material of the shield is a fiber-reinforced polymeric material.

17. The wheel of claim 1, wherein the shield comprises an outer side comprising an outer surface and a plurality of projections projecting from the outer surface.

18. The wheel of claim 1, wherein the wheel is a roller wheel configured to roll on a bottom run of the track.

19. The wheel of claim 1, wherein the wheel is an idler wheel configured to be disposed at a longitudinal end of the track-engaging assembly.

20. The wheel of claim 1, wherein the body of the wheel and the shield are configured to exclusively work with one another.

21. The wheel of claim 1, wherein: the body of the wheel comprises one of a projection and a recess; the shield comprises the other one of the projection and the recess; and the projection is configured to match with the recess.

22. A track system comprising the wheel of claim 1.

23. A method of protecting a wheel of a track system of a vehicle against mud buildup, the track system comprising a track-engaging assembly that includes the wheel and a track movable around the track-engaging assembly, the track being elastomeric to flex around the track-engaging assembly, the wheel comprising a body comprising a rim portion, a hub portion, and a radially-extending portion between the rim portion and the hub portion, the body of the wheel defining an internal void, the method comprising:
   providing a shield with an inner surface comprising fins projecting towards the body of the wheel, wherein at least one of the fins projects from a snap fitting portion projecting from the inner surface to an outer perimeter of the inner surface; and
   removably attaching the shield to the body of the wheel at least with the snap fitting portion of the shield to protect against mud buildup in the internal void of the body of the wheel.

* * * * *

UNITED STATES PATENT AND TRADEMARK OFFICE
CERTIFICATE OF CORRECTION

| | | |
|---|---|---|
| PATENT NO. | : 12,291,292 B2 | Page 1 of 1 |
| APPLICATION NO. | : 17/601166 | |
| DATED | : May 6, 2025 | |
| INVENTOR(S) | : Ghislain Laperle, Matthieu Bergeron and Brandon Thompson | |

It is certified that error appears in the above-identified patent and that said Letters Patent is hereby corrected as shown below:

In the Specification

-In Column 9, Line 1, "50i" should be corrected to read "$50_i$"
-In Column 9, Line 1, "48i" should be corrected to read "$48_i$"
-In Column 9, Line 3, "302" should be corrected to read "$30_2$"
-In Column 9, Line 4, "50i" should be corrected to read "$50_i$"
-In Column 9, Line 4, "48i" should be corrected to read "$48_i$"
-In Column 9, Line 6, "50i" should be corrected to read "$50_i$"
-In Column 9, Line 6, "48i" should be corrected to read "$48_i$"
-In Column 9, Line 7, "48i" should be corrected to read "$48_i$"
-In Column 9, Line 8, "50i" should be corrected to read "$50_i$"
-In Column 9, Line 10, "50i" should be corrected to read "$50_i$"
-In Column 9, Line 11, "48i" should be corrected to read "$48_i$"
-In Column 9, Line 12, "50i" should be corrected to read "$50_i$"
-In Column 9, Line 13, "48i" should be corrected to read "$48_i$"
-In Column 11, Line 30, "50i" should be corrected to read "$50_i$"
-In Column 11, Line 32, "50i" should be corrected to read "$50_i$"
-In Column 11, Line 34, "50i" should be corrected to read "$50_i$"
-In Column 11, Line 34, "301, 302" should be corrected to read "$30_1, 30_2$"
-In Column 11, Line 35, "48i" should be corrected to read "$48_i$"

Signed and Sealed this
Twenty-fourth Day of June, 2025

Coke Morgan Stewart
*Acting Director of the United States Patent and Trademark Office*